United States Patent
Ambrus et al.

(10) Patent No.: US 8,933,912 B2
(45) Date of Patent: Jan. 13, 2015

(54) TOUCH SENSITIVE USER INTERFACE WITH THREE DIMENSIONAL INPUT SENSOR

(75) Inventors: Anthony J. Ambrus, Seattle, WA (US); Abdulwajid N. Mohamed, Redmond, WA (US); Andrew D. Wilson, Seattle, WA (US); Brian J. Mount, Seattle, WA (US); Jordan D. Andersen, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 172 days.

(21) Appl. No.: 13/437,461

(22) Filed: Apr. 2, 2012

(65) Prior Publication Data

US 2013/0257748 A1    Oct. 3, 2013

(51) Int. Cl.
*G06F 3/042*        (2006.01)

(52) U.S. Cl.
USPC ........................................ 345/175; 178/18.09

(58) Field of Classification Search
CPC ........................................ G06F 3/0425–3/0426
USPC ................................................. 345/156–184
See application file for complete search history.

(56) References Cited

U.S. PATENT DOCUMENTS

| | | | |
|---|---|---|---|
| 5,481,265 A | | 1/1996 | Russell |
| 6,512,838 B1 * | | 1/2003 | Rafii et al. .................... 382/106 |
| 6,646,630 B1 | | 11/2003 | Yang |
| 6,674,895 B2 * | | 1/2004 | Rafii et al. .................... 382/154 |
| 6,747,635 B2 | | 6/2004 | Ossia |
| 7,359,003 B1 * | | 4/2008 | Knighton et al. ............. 348/376 |
| 2002/0000977 A1 * | | 1/2002 | Vranish ......................... 345/173 |
| 2003/0063775 A1 * | | 4/2003 | Rafii et al. .................... 382/106 |
| 2004/0032398 A1 * | | 2/2004 | Ariel et al. .................... 345/168 |
| 2005/0197843 A1 | | 9/2005 | Faisman et al. |
| 2006/0181519 A1 | | 8/2006 | Vernier et al. |
| 2006/0267946 A1 * | | 11/2006 | Wecker et al. ................ 345/168 |
| 2007/0098250 A1 | | 5/2007 | Molgaard et al. |
| 2007/0132721 A1 | | 6/2007 | Glomski et al. |
| 2007/0262965 A1 * | | 11/2007 | Hirai et al. .................... 345/173 |
| 2007/0298882 A1 * | | 12/2007 | Marks et al. .................... 463/36 |
| 2009/0219253 A1 | | 9/2009 | Izadi et al. |

(Continued)

FOREIGN PATENT DOCUMENTS

WO        2008132724 A1    11/2008

OTHER PUBLICATIONS

International Search Report and Written Opinion of the International Searching Authority dated Aug. 8, 2013, PCT Application No. PCT/US2013/034868, filed Apr. 2, 2013, 9 pages.

(Continued)

*Primary Examiner* — Gene W Lee
(74) *Attorney, Agent, or Firm* — Aaron Chatterjee; Kate Drakos; Micky Minhas

(57) ABSTRACT

A system and method are disclosed for providing a touch interface for electronic devices. The touch interface can be any surface. As one example, a table top can be used as a touch sensitive interface. In one embodiment, the system determines a touch region of the surface, and correlates that touch region to a display of an electronic device for which input is provided. The system may have a 3D camera that identifies the relative position of a user's hands to the touch region to allow for user input. Note that the user's hands do not occlude the display. The system may render a representation of the user's hand on the display in order for the user to interact with elements on the display screen.

20 Claims, 21 Drawing Sheets

(56) References Cited

U.S. PATENT DOCUMENTS

| | | | |
|---|---|---|---|
| 2009/0239517 A1* | 9/2009 | Ota | 455/418 |
| 2010/0053151 A1 | 3/2010 | Marti et al. | |
| 2010/0060722 A1* | 3/2010 | Bell | 348/51 |
| 2010/0066735 A1 | 3/2010 | Givon | |
| 2010/0079413 A1* | 4/2010 | Kawashima et al. | 345/175 |
| 2010/0090964 A1* | 4/2010 | Soo et al. | 345/173 |
| 2010/0095206 A1* | 4/2010 | Kim | 715/702 |
| 2010/0257414 A1* | 10/2010 | Peters et al. | 714/57 |
| 2010/0315413 A1 | 12/2010 | Izadi et al. | |
| 2011/0080290 A1 | 4/2011 | Baxi et al. | |
| 2011/0141009 A1* | 6/2011 | Izumi | 345/156 |
| 2011/0296357 A1* | 12/2011 | Kim | 715/863 |
| 2012/0051631 A1* | 3/2012 | Nguyen et al. | 382/164 |
| 2012/0249443 A1* | 10/2012 | Anderson et al. | 345/173 |
| 2012/0309532 A1* | 12/2012 | Ambrus et al. | 463/36 |
| 2012/0320157 A1* | 12/2012 | Junuzovic et al. | 348/46 |
| 2012/0320158 A1* | 12/2012 | Junuzovic et al. | 348/46 |
| 2013/0285909 A1* | 10/2013 | Patel et al. | 345/158 |

OTHER PUBLICATIONS

Nielsen, et al., "A Procedure for Developing Intuitive and Ergonomic Gesture Interfaces for Man-Machine Interaction", In Technical Report CVMT 03-01, Aalborg University, Mar. 2003, pp. 1-12, 12 pages.

* cited by examiner

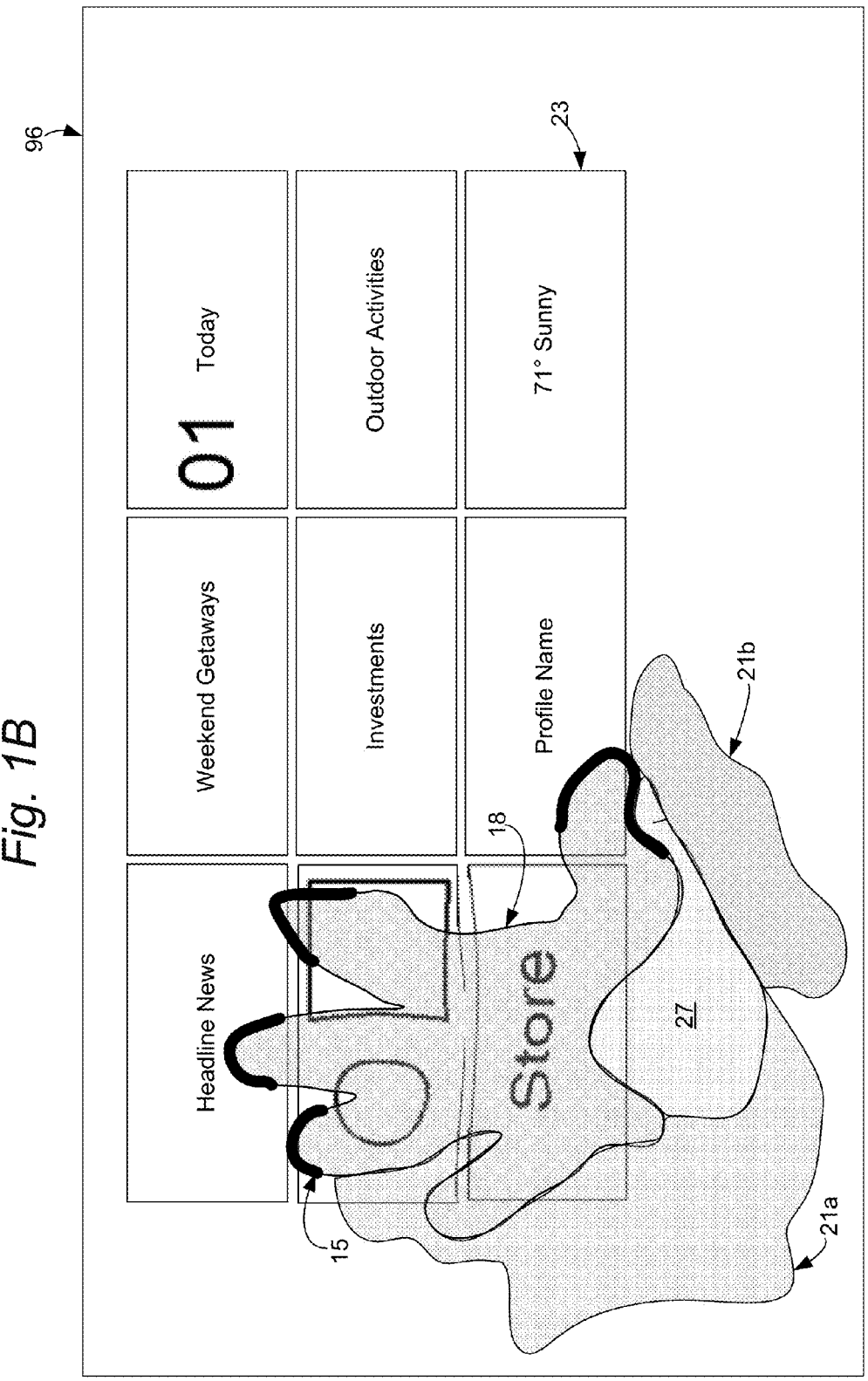

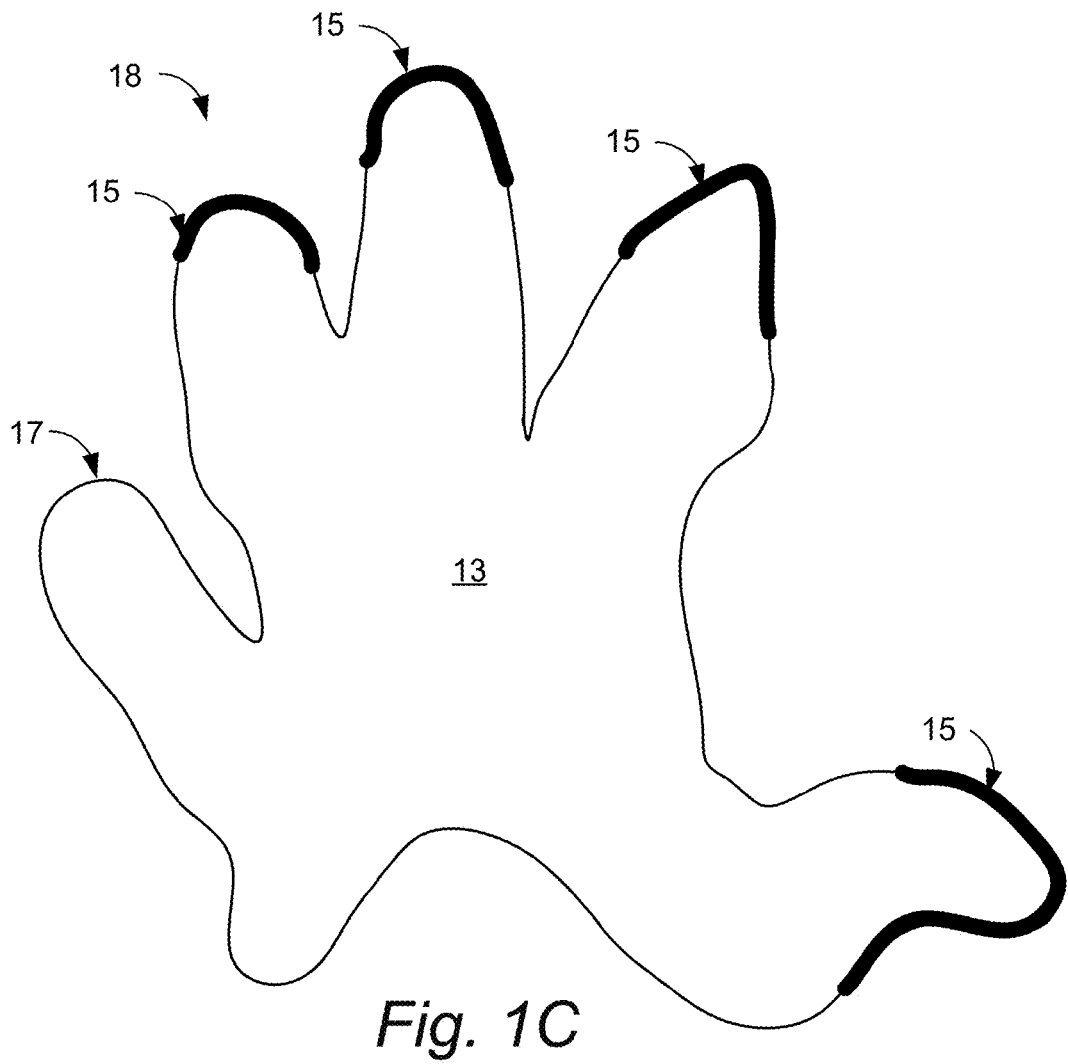

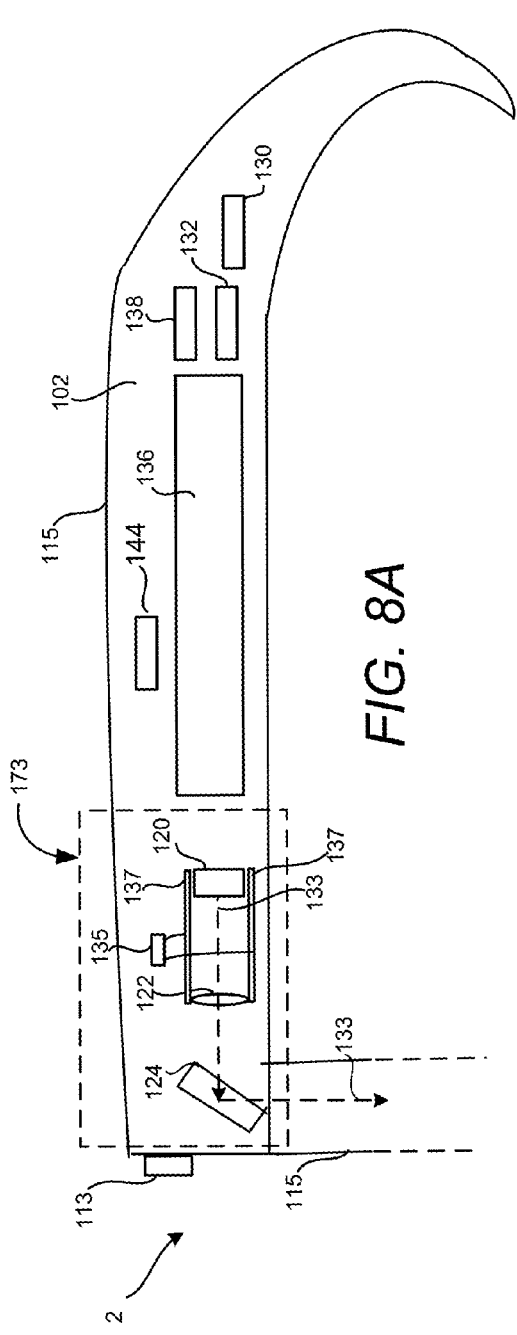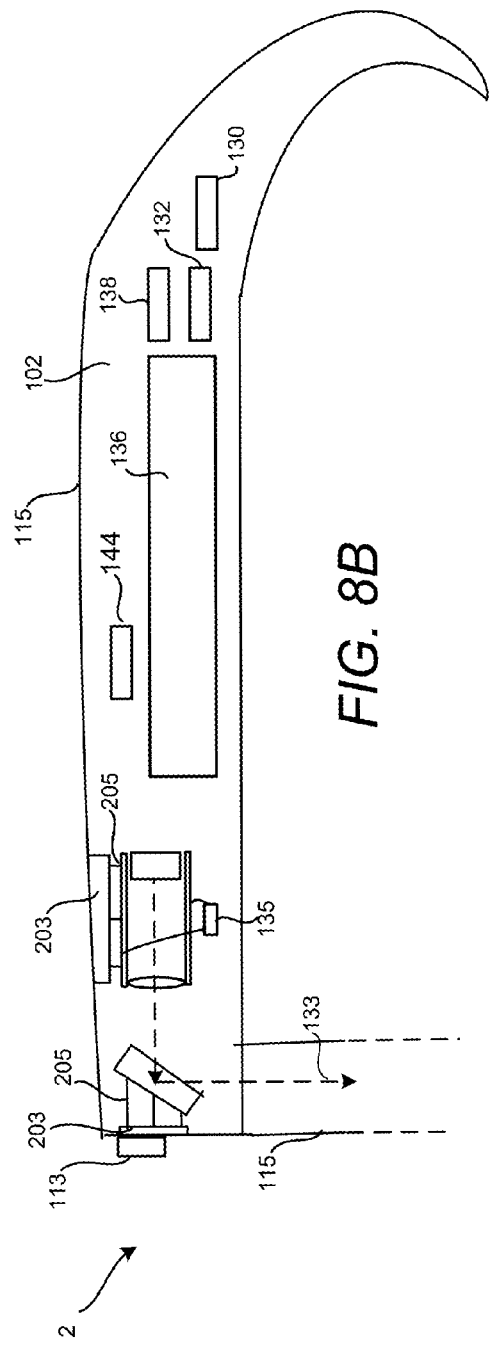

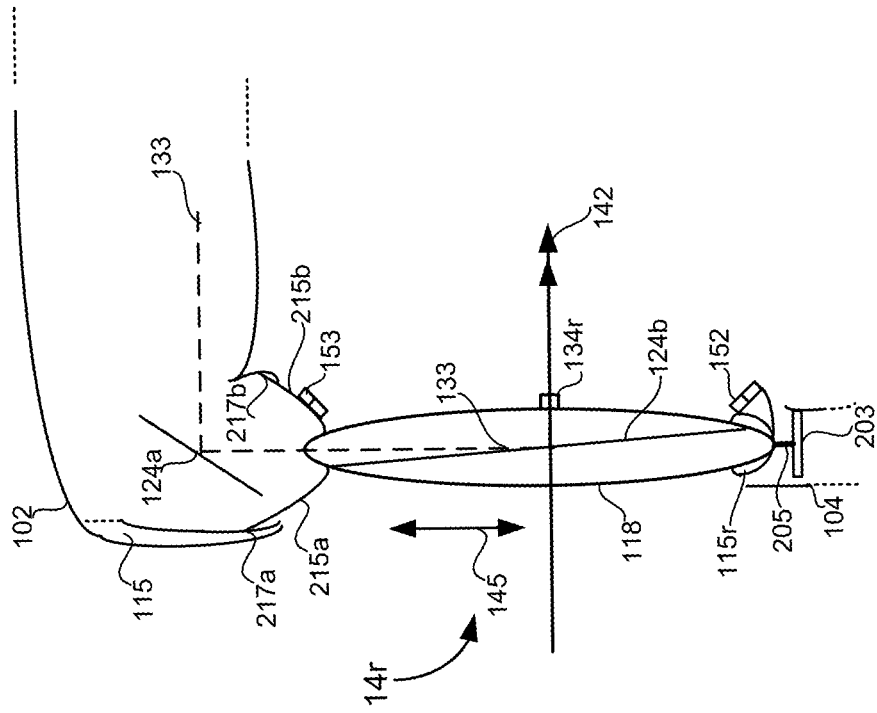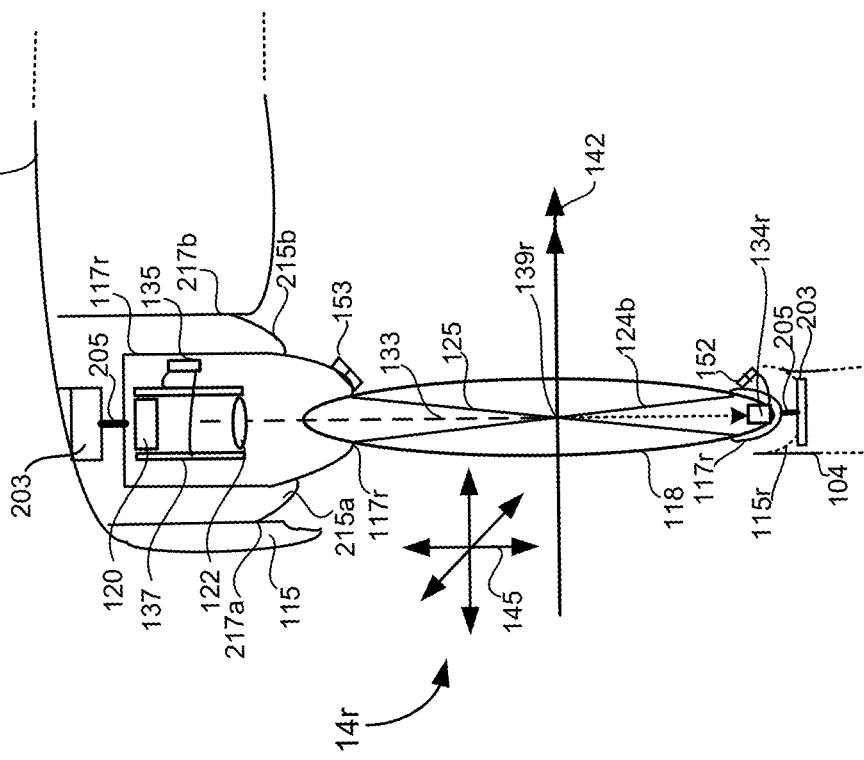

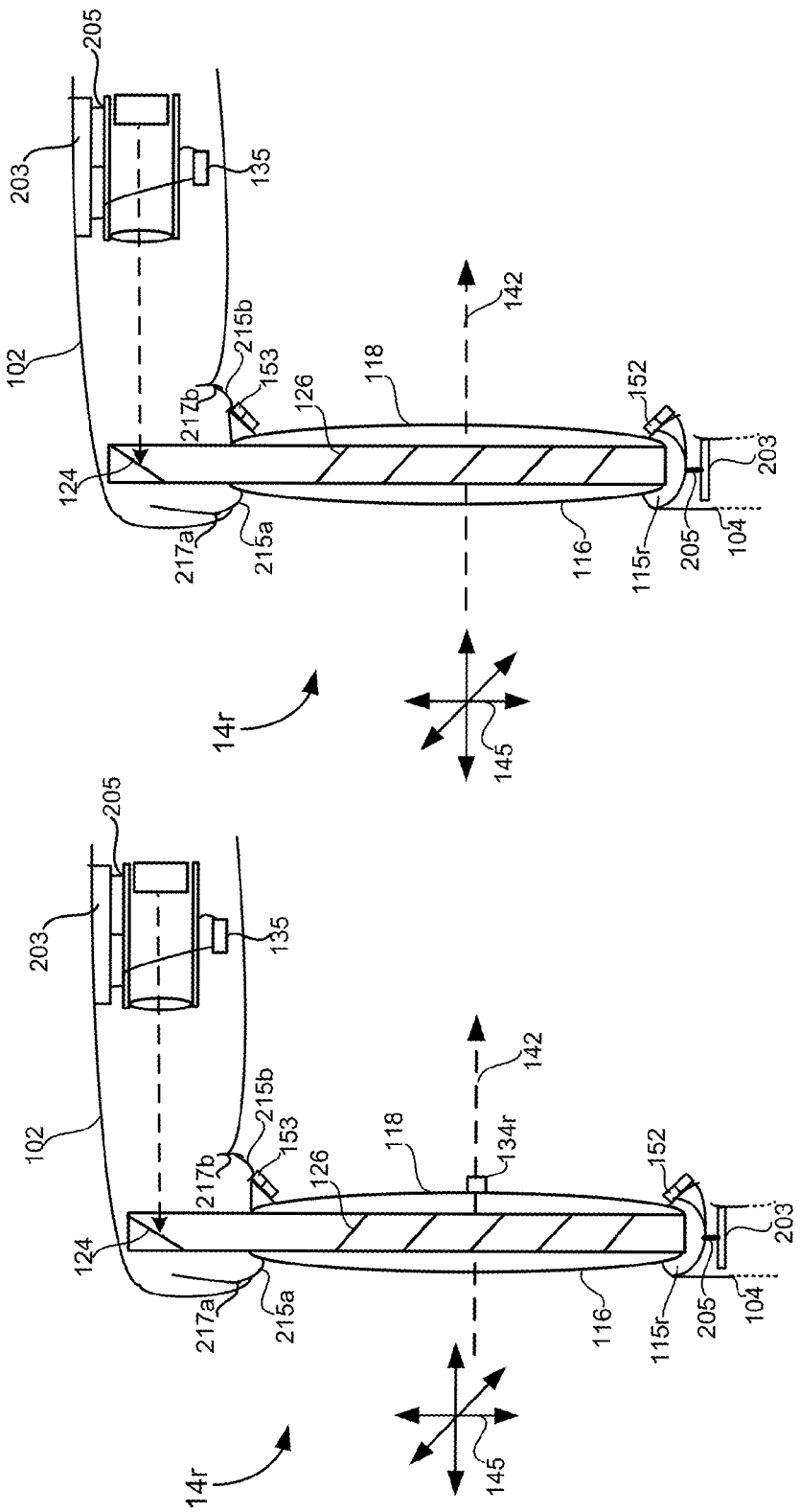

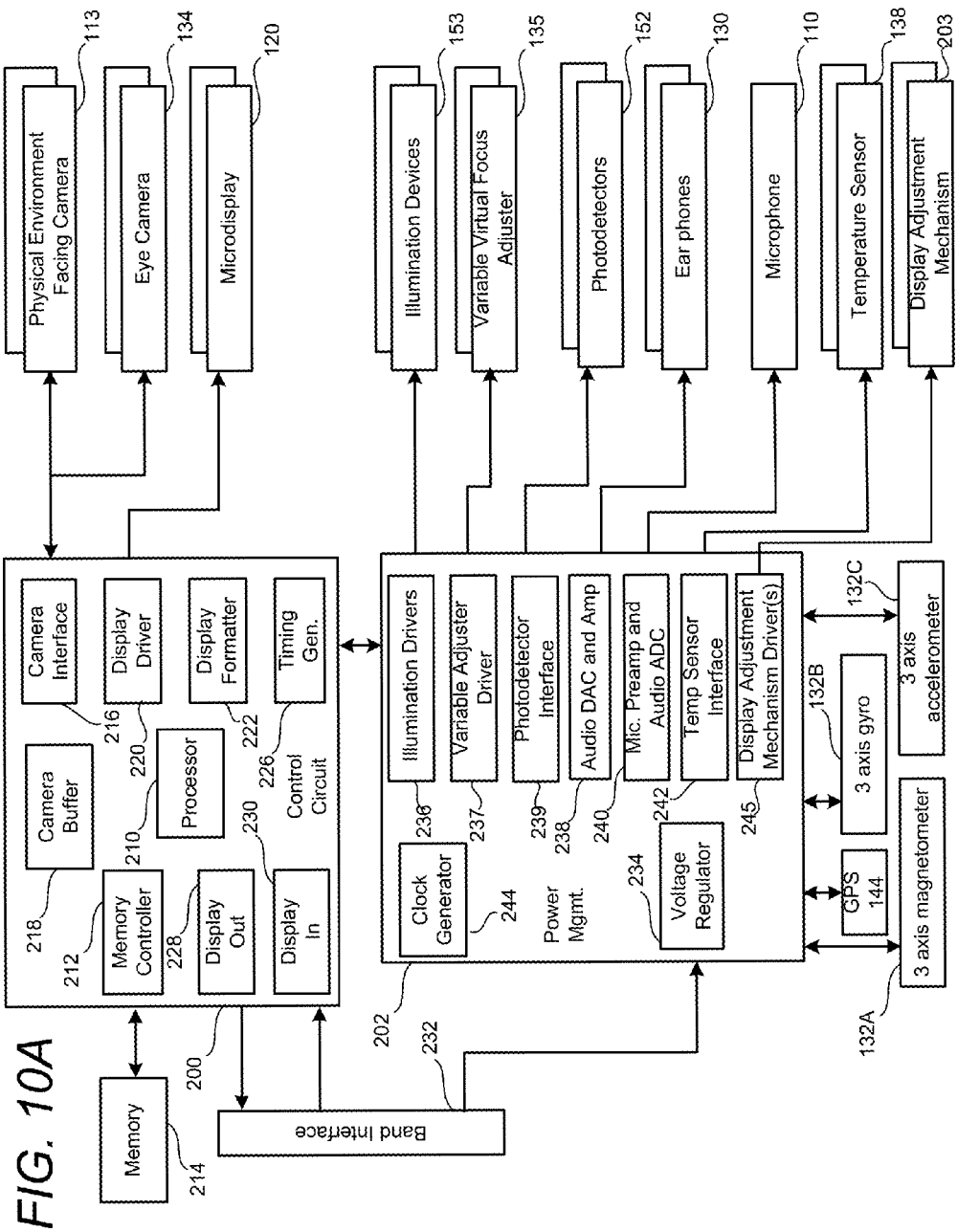

TOUCH SENSITIVE USER INTERFACE WITH THREE DIMENSIONAL INPUT SENSOR

BACKGROUND

In the past, computing devices used keyboards and mice as input devices. Such input devices work well, but require the user to learn the keypad or learn mouse operation. Also, such input devices are not as intuitive to use as many users would like.

More recently, some computer device provide touch sensitive display screens that allow user input. These interfaces may be more intuitive than previous interfaces. However, typically they suffer from the user's hands occluding the display screen. Also, touch sensitive screens are most practical for portable devices or other devices in which the display screen is near the user. However, some devices such as desktop computers have a display screen that is typically some distance from the user. It can be impractical for the user to reach out and touch such a display screen to provide user input.

SUMMARY

Disclosed herein are systems and methods for allowing touch user input to an electronic device associated with a display. The touch interface can be any surface. As one example, a table top can be used as a touch sensitive interface. The system may have a 3D camera that identifies the relative position of a user's hands to the touch interface to allow for user input. Thus, the user's hands do not occlude the display. The system is also able to determine whether the user's hands are hovering over the touch interface. Therefore, the system allows for hover events, as one type of user input.

One embodiment includes a method for allowing user input to an electronic device associated with a display. The method includes determining a three-dimensional (3D) position of an object relative to a surface based on 3D image data. The method further includes rendering a user input element on the display based on the 3D position of the object relative to the surface. The method further includes receiving user input for the electronic device based on the 3D position of the object relative to the surface.

One embodiment includes an apparatus comprising a 3D camera, a display, and processing logic coupled to the 3D camera and to the display. The processing logic is configured to determine a location of a surface based on image data from the 3D camera, and to determine a 3D position of a user's hand relative to the surface based on image data from the 3D camera. The processing logic renders a transparent representation of the user's hand on the display based on the 3D position of the user's hand relative to the surface. Further, the processing logic receives user input based on the 3D position of the user's hand relative to the surface.

One embodiment includes a method of allowing user input to an electronic device associated with a display. The method comprises determining a location of a surface based on 3D image data. The surface is not a surface of the display or of the electronic device. A touch region on the surface is determined. A 3D position of a user's hand relative to the touch region on the surface is determined based on 3D image data. Positions within the touch region are correlated to positions on the display associated with the electronic device. A representation of the user's hand is rendered on the display based on the 3D position of the user's hand relative to the touch region. User input is received for the electronic device based on the 3D position of the user's hand relative to the touch region.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1B depicts one embodiment of what the system displays when one of the user's hands is over the touch region of the table.

FIG. 1C shows one embodiment of the user input element without the display.

FIG. 8A is a side view of an eyeglass temple in an eyeglasses embodiment of a mixed reality display device providing support for hardware and software components.

FIG. 8B is a side view of an eyeglass temple in an embodiment of a mixed reality display device providing support for hardware and software components and three dimensional adjustment of a microdisplay assembly.

FIG. 9A is a top view of an embodiment of a movable display optical system of a see-through, near-eye, mixed reality device including an arrangement of gaze detection elements.

FIG. 9B is a top view of another embodiment of a movable display optical system of a see-through, near-eye, mixed reality device including an arrangement of gaze detection elements.

FIG. 9C is a top view of a third embodiment of a movable display optical system of a see-through, near-eye, mixed reality device including an arrangement of gaze detection elements.

FIG. 9D is a top view of a fourth embodiment of a movable display optical system of a see-through, near-eye, mixed reality device including an arrangement of gaze detection elements.

FIG. 10A is a block diagram of one embodiment of hardware and software components of a see-through, near-eye, mixed reality display unit as may be used with one or more embodiments.

DETAILED DESCRIPTION

Embodiments of the present technology will now be described which in general relate to a touch interface for electronic devices. The touch interface can include any surface. As one example, a table top can be used as a touch sensitive interface. In one embodiment, the system determines a touch region of the surface, and correlates that touch region to a display of an electronic device for which input is provided. The system may have a 3D camera that identifies the relative position of a user's hands to the touch region to allow for user input. Note that the user's hands do not occlude the display. The system may render a representation of the user's hand on the display in order for the user to interact with elements on the display screen.

A wide variety of user input functions are possible including, but not limited to, the following. The user can touch the surface (or touch region) to select an element on the display. The user can move their finger across the surface to drag an element on the display. The user can pinch their fingers together on the surface to zoom out, or separate their fingers to zoom in. Note that the system of one embodiment is able to distinguish the left hand from the right, as well as one finger from another, based on 3D image data. Therefore, this information may be used for more complex user input than is possible with some conventional touch sensitive displays that cannot tell which finger or hand is in contact with the display.

Another possible input is a "hover event". In the context of interfaces to electronic devices, to hover means to show interest but to not commit. In a conventional user interface, a user might position a cursor over an element (such as a hyperlink) without "clicking" a mouse. Thus, the user does not select or commit. However, the user is showing interest in the element. In one embodiment, the user causes a hover event by having their hand within a certain range of distances above the touch region (e.g., within a hover zone). The hover zone may range from about 1 cm to 10 cm above the touch region, for example. Thus user interest may trigger a hover event. A hover event may also be referred to as a "focus event."

As one example, the display is associated with a desktop computer system. The touch region could be just to the right and/or left of the computer keyboard. Alternatively, the user might set the keyboard out of the way such that the touch region is where the keyboard would normally reside.

Figure 1A:
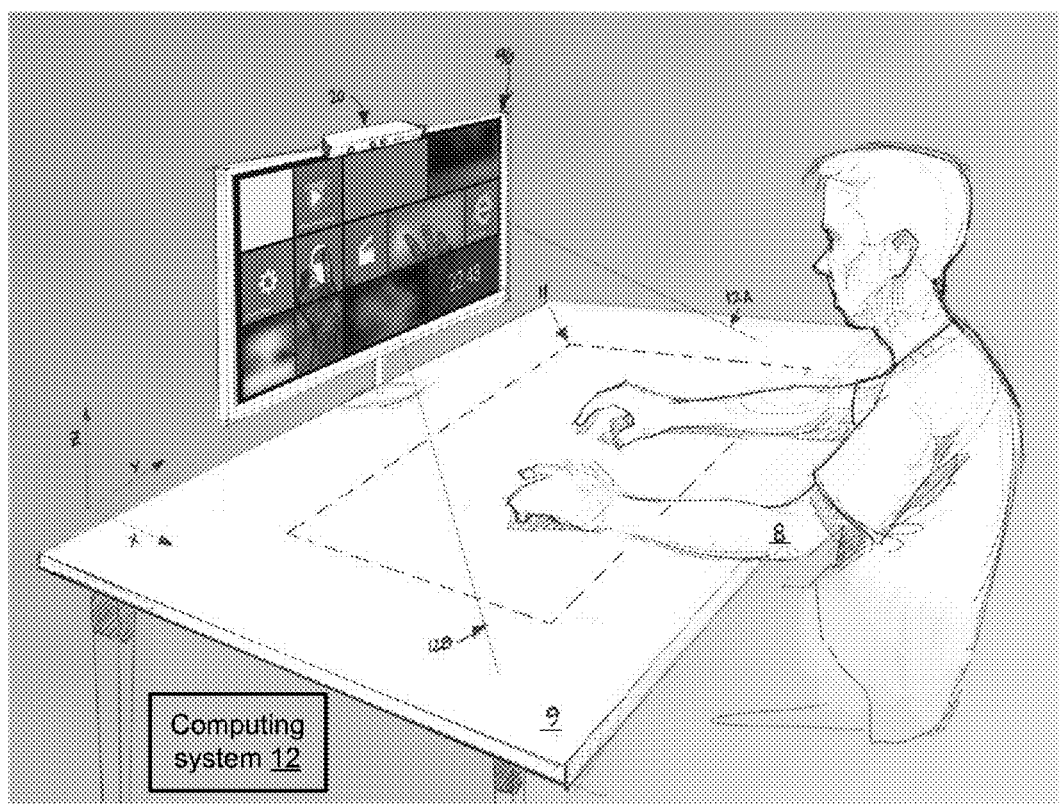
FIG. 1A shows one embodiment of a system for allowing using input via a touch region.

FIG. 1A shows one embodiment of a system that allows user input via a touch region. FIG. 1A shows a user sitting at a table 9 with a display 96 in front of the user. The user has his or her hands extended over the table 9. There is a capture device 20 above the display 96. The capture device 20 may include a 3D camera that is able to determine the position of the user's hands relative to the table 9. The computing system 12 may be communicatively coupled to the display 96 and the capture device 20. As one example, the computing system 12 could be the tower portion of a desktop computer system; however, other possibilities exist. Together, the computing system 12, capture device 20, and display 96 may be referred to as a "system." The system allows the table 9 to be used to provide touch sensitive user input to the computing system 12.

In one embodiment, the capture device 20 emits a collimated light beam. Examples of collimated light include, but are not limited to, Infrared (IR) and laser. Light from the capture device 20 that reflects off from an object 8 in the field of view is detected by the capture device 20. The field of view is roughly depicted by lines 12a, 12b. In this example, the object 8 includes the hands and arms of the user. Light also reflects off from the table 9 and back to the capture device 20. Therefore, the position of the user's hands relative to the table 9 may be determined. In this example, the person uses their hands to enter input. However, in one embodiment, the system tracks an object other than a user's hand to allow input. As one example, the user may cause input by moving a pen or pencil over or on the touch region 11.

In one embodiment, the capture device 20 collects 3D image data using a single RGB camera. In one embodiment, the RGB camera uses motion stereo to determine depth. Determining depth using motion stereo may include comparing two RGB images that are captured at different times. Techniques such as scene understanding may be used to assist in determining depth using a single RGB camera.

A touch region 11 is depicted in dashed lines on the table 9. The touch region 11 is portion of the table 9 that the user may use to provide touch sensitive input for the electronic device associated with the display 96. The user may also hover over the touch region 11 to provide hover input without touching the table 9. In one embodiment, the system determines a suitable portion of the table 9 to be used as the touch region 11. In one embodiment, the system allows the user to specify what portion of the table 9 should be used as touch region 11. There could be more than one touch region 11. For example, there could be a touch region for the right hand and another for the left hand. Note that the touch region 11 does not need to have any sensors or any special characteristics. Thus, the table 9 does not need to be manufactured in any special way. Surfaces other than a table 9 may be used for the touch region 11.

For the sake of discussion, the surface of the table 9 may be considered to be in an x-y plane. In one embodiment, the system determines (x,y,z) coordinates for the user's hands relative to the table 9 (or touch region 11). In one embodiment, the x-y coordinates of the touch region 11 are correlated to an x-y coordinate system for the display 96. In one embodiment, the z-axis corresponds to a distance away from the surface of the table 9. Other coordinate systems may be used.

For example, the coordinates may be expressed from the point of view of the capture device 20, as will be discussed below.

FIG. 1B depicts one embodiment of what the system displays when one of the user's hand is over the touch region 11 of the table 9. In this example, a transparent representation 18 of the user's hand is displayed over various elements 23 on the display screen 96. The representation 18 may be referred to herein as a "user input element" 18. By being transparent, elements 23 behind or below the user input element 18 may be distinctly seen. The user input element 18 is not required to resemble a person's hand. Also note that when a hand is rendered, it is not necessarily an accurate representation of the users' hand in terms of shape.

A variety of rendering effects may be used to help the user intuitively control user input. In one embodiment, the user input element 18 is rendered in some special manner when the user is hovering over the table 9. For example, a certain color could be used to indicate hovering. As one example, the user input element 18 could be transparent blue to indicate hovering. In one embodiment, when a finger is within a contact zone close to the touch region 11 on the table 9, that finger is highlighted on the display 96. This is depicted by the highlights 15 on the edges of the fingertips. The highlights 15 could show the edges of the fingertips glowing, or any other effect.

Another effect is to show shadows 21a, 21b to provide the user with a sense of how far their hand is from the touch region 11. For example, if two shadows 21a, 21b are rendered based on two fictitious light sources, then the hand seems closer to the surface as the shadows 21a, 21b merge together. The merge region 27 of the two shadows 21a, 21b is depicted. Shadows may also be rendered below the user input element 18, although such shadows are not depicted in FIG. 1B.

Other effects may be used to provide the user with a feel for how far their hand is from the touch region 11. In one embodiment, the user input element 18 distorts what is rendered below it, at least to some extent. The amount of distortion is increased as the hand is moved farther from the touch region 11, in one embodiment. For example, the word "Store" appears somewhat distorted. As the user moves their hand closer to the touch region 11 the distortion becomes less, in one embodiment. Note that even if there is some level of distortion, the user input element 18 may still be considered to be transparent, as opposed to being translucent or being opaque.

FIG. 1C shows one embodiment of the user input element 18 without the display 96. The user input element 18 has a transparent inner portion 13 surrounded by edges 15, 17. Some of the edges represent touch points 15. In this example, the tips of several of the fingers and the thumb are touch points 15. The touch points 15 are rendered in a different manner from the other edges so that the user can see where they are within the contact zone. Note that the contact zone may be within some relatively close distance to the touch region 11. Therefore, the touch points 15 do not necessary correspond to portions that are actually in physical contact with the touch region 11.

Note that edges 17 that are not contact points may be rendered differently from the inner transparent portion 13 to help the user clearly see the edge of the user input object 18. For example, edges 17 may be rendered somewhat brighter, or alternatively darker, than the transparent region 13 to help the edges 17 stand out. Other effect may be used for the edges 17 to help them stand out.

Figure 1D:
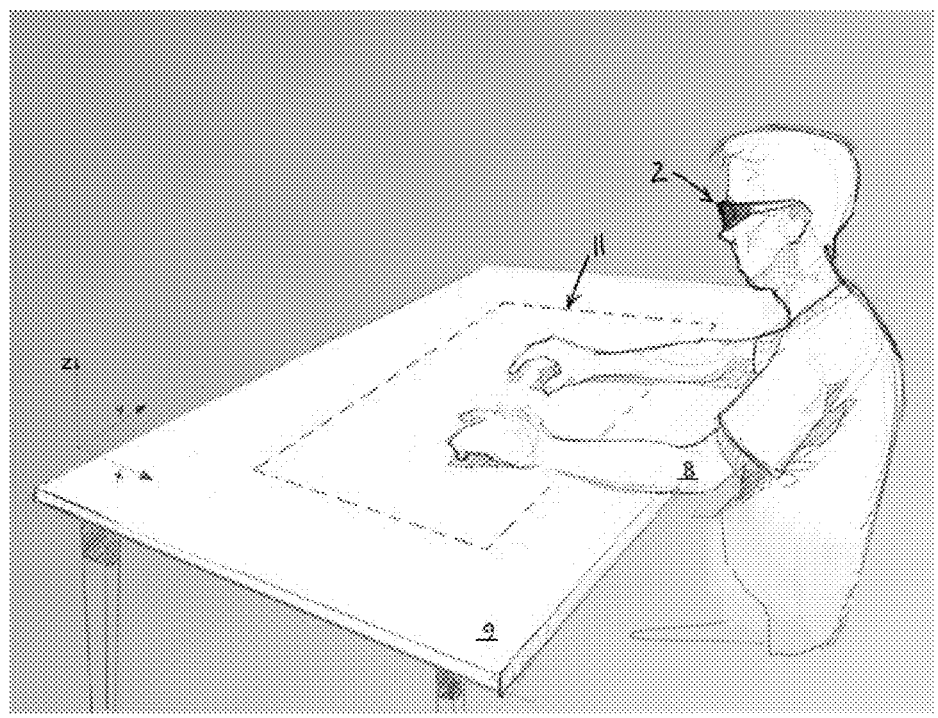
FIG. 1D shows a system that allows a user wearing an HMD to provide input by touching or hovering over the surface of table.

The display 96 could be associated with other types of electronic devices. Another example is what may be referred to as a "head-mounted display" or a "heads-up display." FIG. 1D shows a system that allows a user wearing an HMD 2 to provide input by touching or hovering over the surface of table 9. In one embodiment, the HMD 2 has a 3D camera that is able to determine the location of the user's hands relative to the touch region 11 on the table 9. However, a different camera system could be used. Thus, the HMD is not required to have the 3D camera system.

The HMD 2 display may render an image similar to the one depicted in FIG. 1B to show the user where their hand is located relative to elements on the display 96. In one embodiment, the HMD 2 renders the image such that it appears to the user that some surface, such as the table 9 or a wall, is acting as a display surface. Note that if the table 9 is used, the image could seem to appear in a different region of the table 9 than the touch region 11 such that the user's hands do not interfere with the image. However, one option is to present the display image such that it roughly coincides with the touch region 11.

Figure 1E:
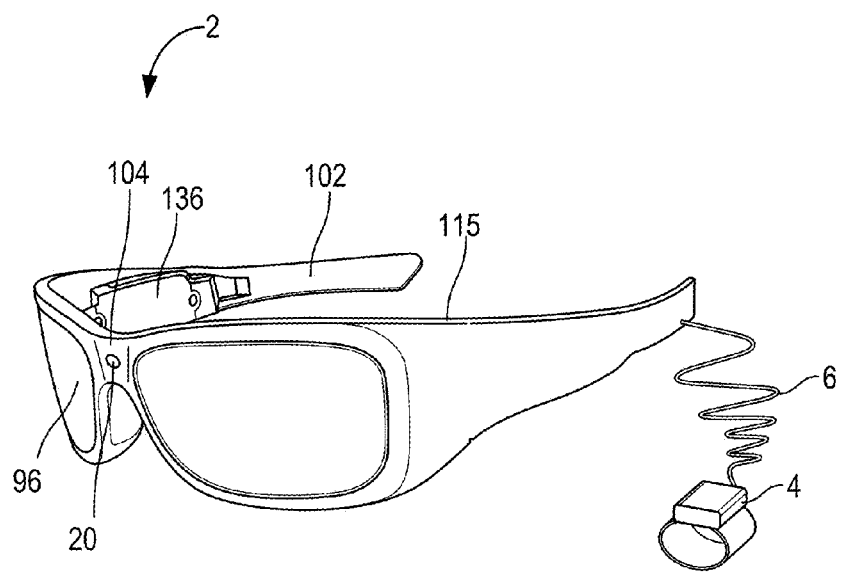
FIG. 1E shows a see-through display device as a near-eye, head mounted display device.

FIG. 1E shows a see-through display device as a near-eye, head mounted display (HMD) device 2 in communication with processing unit 4 via wire 6. In other embodiments, head mounted display device 2 communicates with processing unit 4 via wireless communication. Processing unit 4 may take various embodiments. In some embodiments, processing unit 4 is a separate unit which may be worn on the user's body, e.g. the wrist in the illustrated example or in a pocket, and includes much of the computing power used to operate near-eye display device 2. Processing unit 4 may communicate wirelessly (e.g., WiFi, Bluetooth, infra-red, or other wireless communication means) to one or more computing system 12, hot spots, cellular data networks, etc. In other embodiments, the functionality of the processing unit 4 may be integrated in software and hardware components of the HMD 2. The processing unit may also be referred to as "processing logic." Processing logic may include any combination of hardware and/or software. For example, processing logic could include an application specific integrated circuit (ASIC). Processing logic could include a computer readable storage device having stored thereon processor executable instructions and a processor which executes the instructions.

Head mounted display device 2, which in one embodiment is in the shape of eyeglasses in a frame 115, is worn on the head of a user so that the user can see through a display, embodied in this example as a display optical system 96 for each eye, and thereby have an actual direct view of the space in front of the user. The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Based on the context of executing software, for example, a gaming application, the system can project images of virtual objects, sometimes referred to as virtual images, on the display that are viewable by the person wearing the see-through display device while that person is also viewing real world objects through the display.

Frame 115 provides a support for holding elements of the system in place as well as a conduit for electrical connections. In this embodiment, frame 115 provides a convenient eyeglass frame as support for the elements of the system discussed further below. In other embodiments, other support structures can be used. An example of such a structure is a visor, hat, helmet or goggles. The frame 115 includes a temple or side arm for resting on each of a user's ears. Temple 102 is representative of an embodiment of the right temple and includes control circuitry 136 for the HMD 2. Nose bridge 104 of the frame may include a capture device 20, which is able to detect object in its field of view using 3D imaging.

Figure 1F:
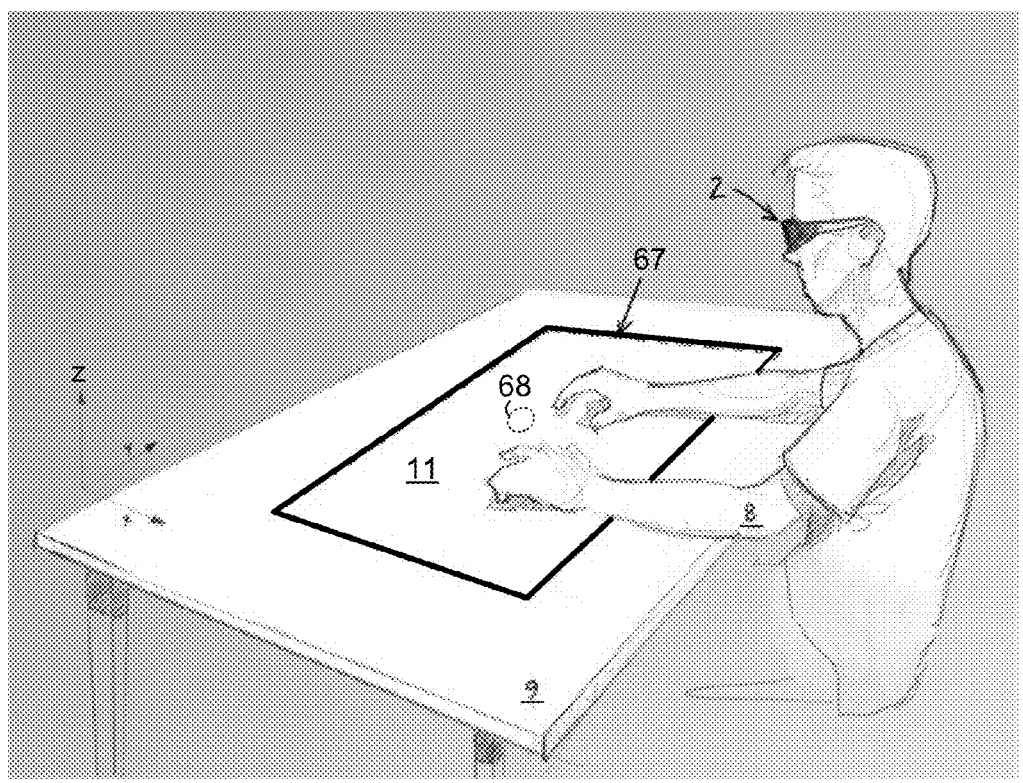
FIG. 1F shows a system that allows a user to provide input by touching or hovering over the surface of a display screen with an integrated depth camera.

FIG. 1F shows one embodiment of a system that provides a touch interface using a depth camera system that is within or behind a screen 67. The user is sitting at a table 9 and interacting with a screen 67 that has a depth camera system behind or built into the screen. The depth camera system is able to capture 3D image data. The depth camera system may include a light source 68 and one or more (possibly many) light detectors. As one example, the light source by be Infrared (IR). In one embodiment, each pixel of the screen 67 serves as a light detector. However, the light detectors are not required to be part of the pixels. The pixels could be part of an LCD screen, although other technologies may be used. In one embodiment, light from light source 68 travels through the screen 67 and is reflected off the user 8. The reflected light is captured by one or more light detectors in or behind the screen 67. The position of the user's hands relative to the screen 67 may thus be determined. Note that this may include an x-, y-, and z-position.

The screen 67 may also be capable of use as a display. However, the screen 67 does not need to be used as a display when using the touch interactive system. Rather, the HMD 2 being worn by the user 8 may be used as the display, similar to the example of FIG. 1D. Thus, the system determines the position of the user's hands relative to the screen 67 using the depth camera system within or behind the screen 67. The system displays a representation of the user's hands in the HMD 2 (or some other display). For example, the HMD 2 may show an image such as the one in FIG. 1B. Note that the user is not necessarily looking down at the table 9 when interacting. For example, the user could be looking at a wall, such that the image presented in the HMD 2 appears to be a display screen on the wall. Thus, a difference between the embodiment shown in FIG. 1F and the one of FIG. 1D is the location of the depth camera system. In the embodiment of FIG. 1F, the HMD 2 does not need to have a depth camera.

Figure 2:
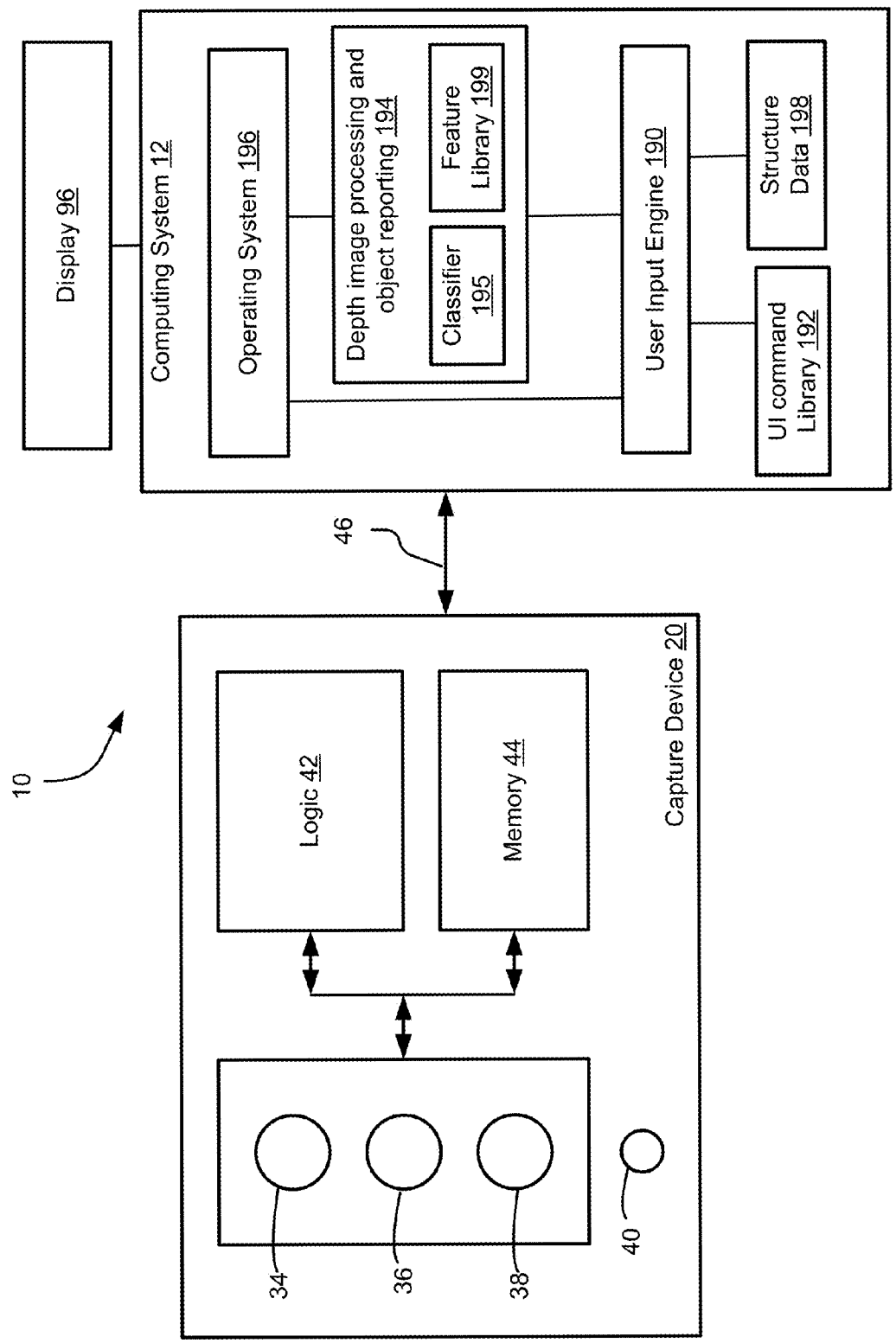
FIG. 2 illustrates one embodiment of a system including a capture device and computing system that may be used to allow user input to an electronic device.

FIG. 2 illustrates one embodiment of a system 10 including a capture device 20 and computing system 12 that may be used to allow user input to an electronic device. The electronic device could include the computing system 12, but that is not required. In one embodiment, the capture device 20 is a depth camera (or depth sensing camera) configured to capture 3D image data, which includes still images and video with depth information. The depth information may include a depth map with depth values. The depth camera can use a variety of techniques including, but not limited to, time-of-flight, structured light, stereo image, or the like. In one embodiment, the capture device 20 includes a depth sensing image sensor.

The depth map may include a two-dimensional (2-D) pixel area of the captured scene where each pixel in the 2-D pixel area may represent a depth value such as a distance in, for example, centimeters, millimeters, or the like of an object in the captured scene from the camera. The image camera component 32 may be pre-calibrated to obtain estimates of camera intrinsic parameters such as focal length, principal point, lens distortion parameters etc. Techniques for camera calibration are discussed in, Z. Zhang, "A Flexible New Technique for Camera Calibration," *IEEE Transactions on Pattern Analysis and Machine Intelligence,* 22(11):1330-1334, 2000, which is hereby incorporated by reference.

As shown in FIG. 2, the capture device 20 may include an IR light component 34, a three-dimensional (3-D) camera 36, and an RGB camera 38 that may be used to capture the depth map of a capture area. For example, in time-of-flight analysis, the IR light component 34 of the capture device 20 may emit an infrared light onto the capture area and may then use sensors to detect the backscattered light from the surface of one or more targets and objects in the capture area using, for example, the 3-D camera 36 and/or the RGB camera 38. In some embodiment, capture device 20 may include an IR CMOS image sensor. In some embodiments, pulsed infrared light may be used such that the time between an outgoing light pulse and a corresponding incoming light pulse may be measured and used to determine a physical distance from the capture device 20 to a particular location on the targets or objects in the capture area. Additionally, the phase of the outgoing light wave may be compared to the phase of the incoming light wave to determine a phase shift. The phase shift may then be used to determine a physical distance from the capture device to a particular location on the targets or objects.

In one embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example, the capture device 20 may use structured light to capture depth information. In such an analysis, patterned light (i.e., light displayed as a known pattern such as grid pattern or a stripe pattern) may be projected onto the capture area via, for example, the IR light component 34. Upon striking the surface of one or more targets (or objects) in the capture area, the pattern may become deformed in response. Such a deformation of the pattern may be captured by, for example, the 3-D camera 36 and/or the RGB camera 38 and analyzed to determine a physical distance from the capture device to a particular location on the targets or objects.

In some embodiments, two or more different cameras may be incorporated into an integrated capture device. For example, a depth camera and a video camera (e.g., an RGB video camera) may be incorporated into a common capture device. In some embodiments, two or more separate capture devices may be cooperatively used. For example, a depth camera and a separate video camera may be used. When a video camera is used, it may be used to provide target tracking data, confirmation data for error correction of target tracking, image capture, body part recognition, high-precision tracking of fingers (or other small features), light sensing, and/or other functions.

In one embodiment, the capture device 20 may include two or more physically separated cameras that may view a capture area from different angles to obtain visual stereo data that may be resolved to generate depth information. Depth may also be determined by capturing images using a plurality of detectors that may be monochromatic, infrared, RGB, or any other type of detector and performing a parallax calculation. Other types of depth map sensors can also be used to create a depth map.

As shown in FIG. 2, capture device 20 may include a microphone 40. The microphone 40 may include a transducer or sensor that may receive and convert sound into an electrical signal. In one embodiment, the microphone 40 may be used to reduce feedback between the capture device 20 and the computing system 12 in the target detection and tracking system 10. Additionally, the microphone 40 may be used to receive audio signals that may also be provided by the user to provide user input to the computer system 12. For example, after the user enters some command using the touch interface, the system 12 might prompt the user to verify the command by providing audio input.

The capture device 20 may include logic 42 that is in communication with the image camera component 22. The logic 42 may include a standardized processor, a specialized processor, a microprocessor, or the like that may execute instructions. The logic 42 may also include hardware such as an ASIC, electronic circuitry, logic gates, etc. In the event that the logic 42 is a processor, the processor 42 may execute instructions that may include instructions for determining the depth map, and determining whether a target such as a hand in the depth map. Note that the computing system 12 may have a separate processor for performing one or more steps for allowing user input via the touch interface. In some embodiments, the logic 42 in the depth camera performs initial processing of the depth image and the processor in the computer system 12 performs higher level functions. Note that the division of labor between the logic in the capture device 20 and the processor in the computer system 12 may be divided in any manner.

As shown in FIG. 2, the capture device 20 may include a memory component 44 that may store the instructions that may be executed by the processor 42, images or frames of images captured by the 3-D camera or RGB camera, user profiles or any other suitable information, images, or the like. In one example, the memory component 44 may include random access memory (RAM), read only memory (ROM), cache, Flash memory, a hard disk, or any other suitable storage component. The memory component 44 may also be referred to as a computer storage medium or a computer storage device. As shown in FIG. 2, the memory component 44 may be a separate component in communication with the image capture component 34 and the processor 42. In another embodiment, the memory component 44 may be integrated into the processor 42 and/or the image capture component 34. In one embodiment, some or all of the components 34, 36, 38, 40, 42 and 44 of the capture device 20 illustrated in FIG. 2 are housed in a single housing.

As shown in FIG. 2, the capture device 20 may be in communication with the computing system 12 via a communication link 46. The communication link 46 may be a wired connection including, for example, a USB connection, a Firewire connection, an Ethernet cable connection, or the like and/or a wireless connection such as a wireless 802.11b, g, a, or n connection. The computing system 12 may provide a clock to the capture device 20 that may be used to determine when to capture, for example, a scene via the communication link 46.

In one embodiment, the capture device 20 may provide the depth information and images captured by, for example, the 3-D camera 36 and/or the RGB camera 38 to the computing system 12 via the communication link 46. The computing system 12 may then use the depth information and captured images to, for example, create a virtual screen, adapt the user interface and control an application such as a game or word processor.

As shown in FIG. 2, computing system 12 includes UI command library 192, structure data 198, user input engine 190, depth map processing and object reporting module 194, and operating system 196. Depth map processing and object reporting module 194 uses the depth maps to track the motion of objects, such as the user and other objects. To assist in the tracking of the objects, depth map processing and object reporting module 194 uses UI command 190, structure data 198 and user input engine 190. In some embodiments, the depth map processing and object reporting module 194 uses a classifier 195 and a feature library 199 to identify objects.

In one example, structure data 198 includes structural information about objects that may be tracked. For example, a skeletal model of a human may be stored to help understand movements of the user and recognize body parts. In one embodiment, a user's hands and fingers may be recognized. The skeletal model may allow the right hand to be distinguished from the left, as well as distinguish one finger from another. In another example, structural information about inanimate objects, such as props, may also be stored to help recognize those objects and help understand movement. As one example, props that might be used for user input, such as pens and pencils, could be recognized.

In one example, UI command library 192 may include a collection of user input commands. These commands could involve various motions of the user, as well as what hand/finger is performing the motion. Thus, the UI command library 192 has information to help link a particular body part to a command, in one embodiment. For example, the UI command library 192 may compare the data captured by capture device 20 in the form of the skeletal model and movements associated with it to filters in the UI command library 192 to identify when a user (as represented by the skeletal model) has performed one or more commands. Those commands may be associated with various controls of an application.

Figure 3:
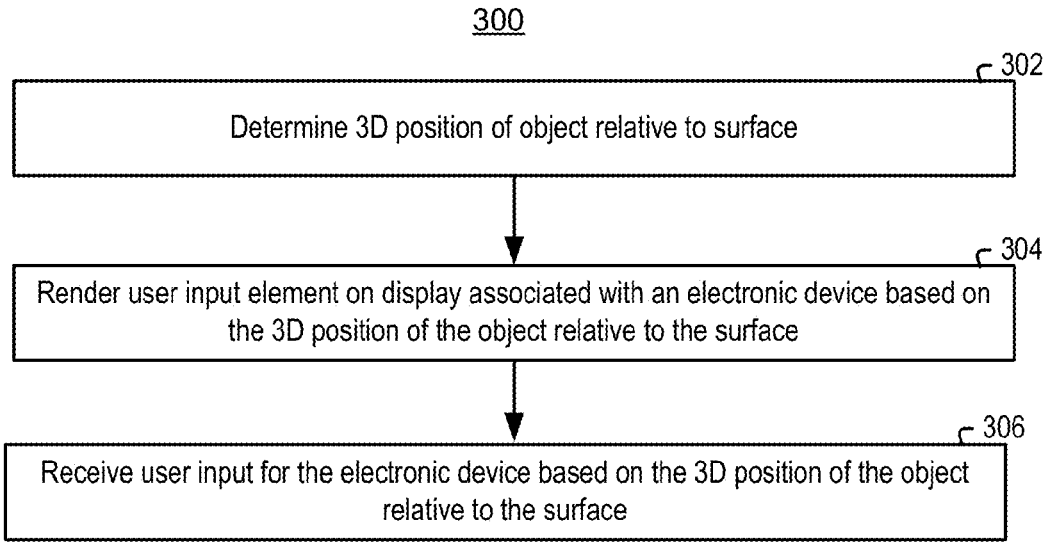
FIG. 3 is a flowchart of one embodiment of a process of receiving user input to an electronic device associated with a display based on 3D image data.

FIG. 3 is a flowchart of one embodiment of a process 300 of receiving user input to an electronic device associated with a display 96 based on 3D image data. Examples of the electronic device include a desktop computer system and an HMD 2. The process 300 may be used to allow a user to provide input by contacting or hovering over a table 9, as one example. The process 300 could be performed by a computing system 12 that could include a desktop computer, an HMD 2, or another electronic device.

In step 302, the 3D position of an object is determined relative to a surface. The object may be a user's hands. Often the surface with be a horizontal plane, but that is not a requirement. Any surface may be used. For example, the surface could be a vertical plane or any diagonal plane. Furthermore, the surface is not required to be planar. For example, the surface could have undulations. The surface could have some other geometric shape, such as a hemisphere.

Step 302 may include determining a projection of a user's hands onto a touch region. For example, the touch region 11 may be defined to be in an x-y plane, wherein the x-y position of a user's hand relative to the touch region 11 is determined. Step 302 may also include determining how far the user's hand is away from the touch region 11. For example, the system determines how far the user's hand is away from the plane of the touch region 11. If the touch region 11 is a horizontal plane, then the system determines how far the hand is above the touch region 11. As noted, the touch region 11 is not required to be a horizontal plane. Thus, the distance away from the touch region 11 could be a vertical distance or some other orientation. In one embodiment, at least one plane is defined for the touch region 11, wherein the distance away from the plane is determined by a line normal to the plane. In one embodiment, the touch region 11 is associated with pixels of a depth image from the capture device 20. In this case, a plane equation can be defined for each of these pixels. Thus, the touch region 11 may be associated with many planes.

In step 304, a user input element 18 is rendered on the display 96 associated with the electronic device based on the 3D position of the user's hand. This may include rendering a transparent representation of the user's hand at an appropriate x-y location of the display 96. Also, the distance that the user's hand is away from the surface having the touch region 11 may be used to determine whether the user is in a contact zone, hover zone, or further away. This information may be used to render the user input element 18 in a manner that depicts whether the user is in the contact zone, hover zone, or further away.

In step 306, user input is received for the electronic device based on the 3D position of the user's hand relative to the touch region 11. If the user is touching or nearly touching the surface having the touch region 11, the input might be a selection of an element on the display 96. If the user is hovering slightly further away from the surface, the input might be for a hover or focus event. One example of a hover event is to present additional information for an element on the display 96. For example, if the user is hovering over a telephone number on the display 96, the hover event could be to present a menu of options including dialing that number, performing a reverse lookup, sending an email to that person (if email address is known), etc.

Figure 4A:
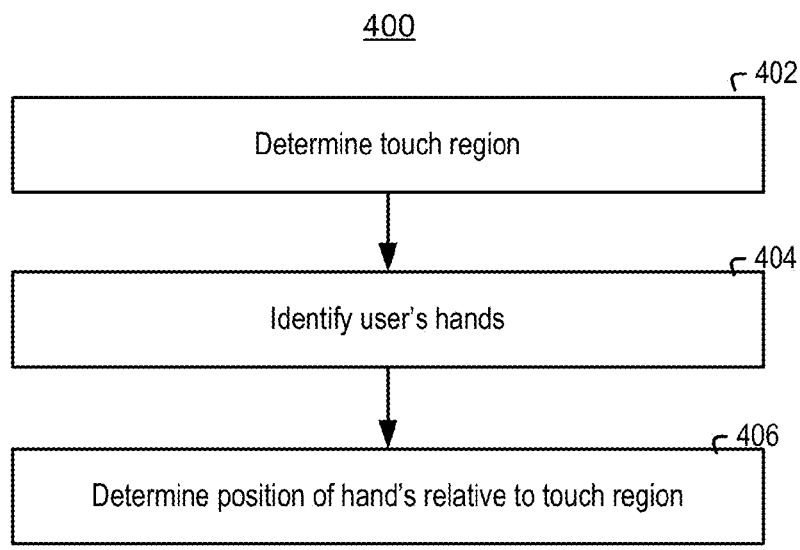
FIG. 4A is a flowchart of one embodiment of a process of determining a position a user's hands relative to a touch region.

FIG. 4A is a flowchart of one embodiment of a process 400 of determining a position a user's hands relative to a touch region 11. Process 400 is one embodiment of step 302. In step 402, a touch region 11 is determined. In one embodiment, step 402 is performed during a calibration period that may be performed prior to other steps of FIG. 4. For example, step 402 may be used when determining a background. In one embodiment, the touch region 11 is determined on a more or less continuous basis. Thus, if the capture device 20 is jostled, suitable adjustments may be made to the data that defines the location of the touch region 11 to compensate for the jostling while keeping the actual touch region 11 in place for the user.

In step 404, user's hands are identified. In one embodiment, step 404 is performed after the calibration period has ended. Thus, step 404 may use a different set of image data than step 402. However, in one embodiment, steps 402 and 404 are performed using the same set of image data. As noted, the touch region 11 may be determined on a more or less continuous basis, in which case the same images data could be used to determine the touch region and to identify hands.

In step 406, the position of the user's hands relative to the touch region 11 is determined. Step 406 may include determining whether the user's hands are in the contact, zone, the hover zone, or further away. Step 406 may also include determining what portion of a plane of the touch region 11 that the hands project onto.

Figure 4B:
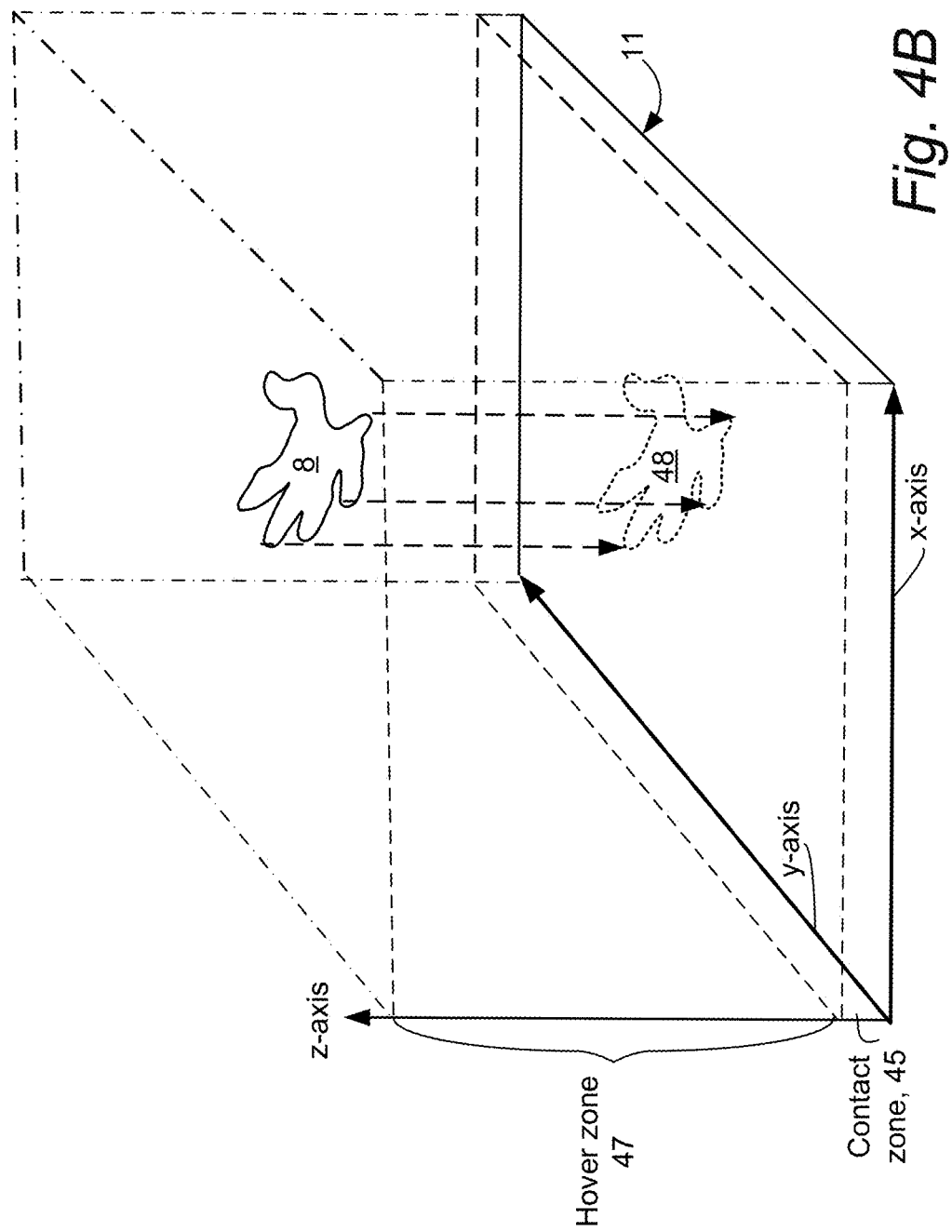
FIG. 4B is a diagram to illustrate mapping a user's hand to the touch region.

FIG. 4B is a diagram to illustrate mapping a user's hand to the touch region 11, which may be performed during step 406 of process 400. A user's hand 8 is depicted above the touch region 11. For the sake of discussion, the touch region 11 lies within an x-y plane with the z-axis being normal to that plane. Note that it is not required that all points in the touch region 11 lie within the same plane. FIG. 4B depicts a contact zone 45 that extends away from the x-y plane of the touch region 11 in the z-direction. The hover zone 47 begins at outer extent of the contact zone 45 extends further away from the touch region 11 along the z-axis. Note that the hand 8 may still be detected by the capture system 20 even if it is outside of the hover zone 47 (e.g., further away along the z-axis). FIG. 4B also shows a projection 48 of the user's hand 8 onto the x-y plane of the touch region 11.

Although FIGS. 4A and 4B, and other examples discussed herein, refer to an example in which the user's hands are identified and mapped to the touch region 11, it will be understood that other objects may be used for user input. Also, note that it is not required that the object be positively identified as a particular type of object. For example, it is not required that the object be identified as a hand. However, in some embodiments, object recognition is used.

Figure 5B:
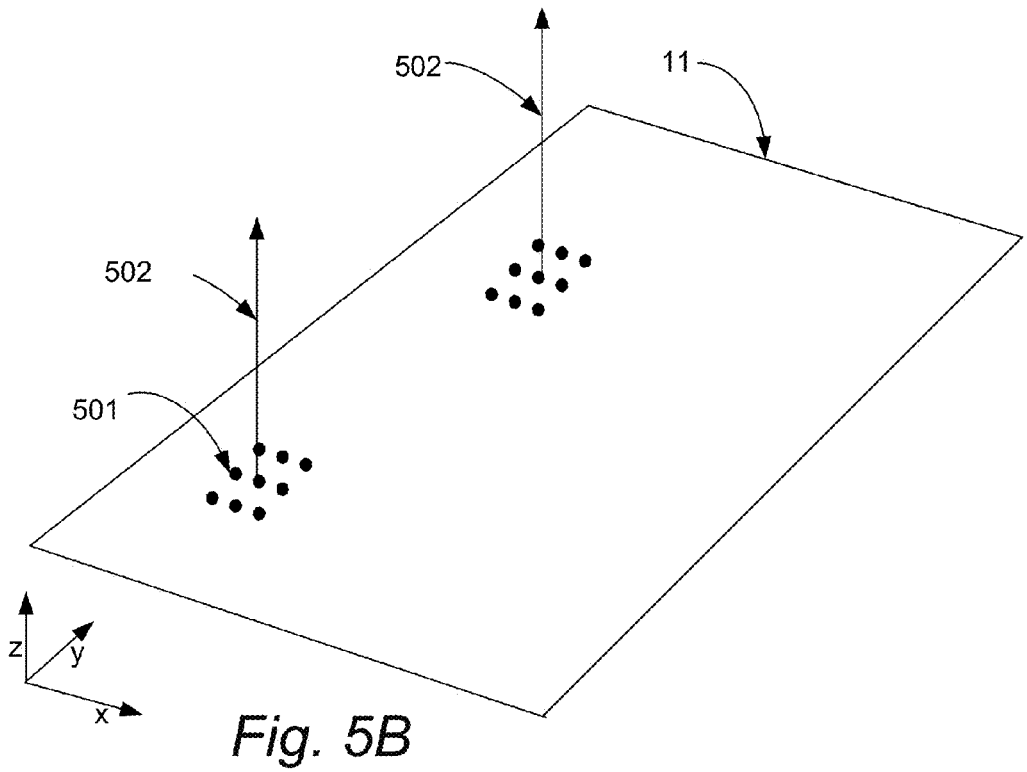
FIG. 5B shows details of one embodiment of determining plane equations for a touch region.
Figure 5A:
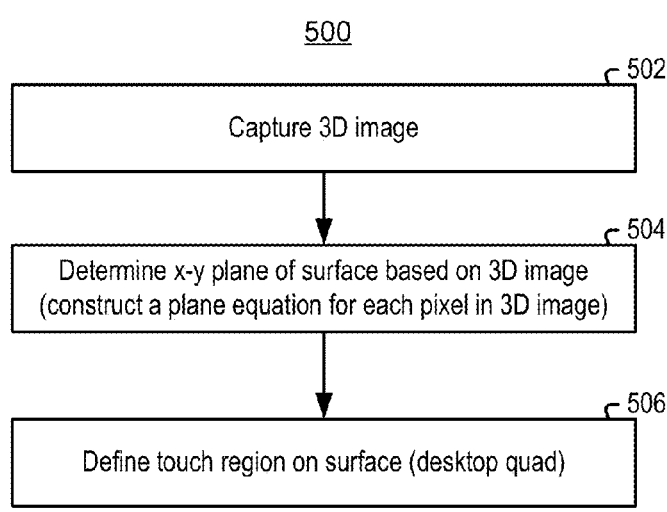
FIG. 5A is a flowchart of one embodiment of a process of determining a touch region.

FIG. 5A is a flowchart of one embodiment of a process 500 of determining a touch region 11. Process 500 provides details of one embodiment of step 402. In process 500 the touch region 11 may be determined during a calibration period prior to identifying the user's hands. In step 502, a 3D image is captured. The 3D image may include an array of depth pixels. For the sake of discussion, this array will be referred to as a (u, v) array. Thus, each depth pixel is associated with a (u, v) coordinate, in one embodiment. Each depth pixel has a depth value, in one embodiment. At this point, the depth values may be in terms of distance from the camera. Thus, note that these depth values are not distances from the table 9.

In step 504, a plane of a surface is determined based on the 3D image. In one embodiment, depth values are first analyzed to look for pixels that seem to be a surface. Groups of neighboring pixels having similar depth values are one cue. The size of the surface is also one cue. If there is more than one possible surface, factors such as the surface size, slope, and distance from the capture device 20 may be used.

In one embodiment, a plane equation is determined for each pixel in the depth image. The plane equation for a given pixel may be determined by analyzing the depth values for neighboring pixels. For each pixel, a plane equation may be defined based on its 3D location and a normal line from that location. The normal line may be determined by the aforementioned analysis of positions of the neighbor pixels. Thus, step 504 includes determining a plane equation for each pixel in the 3D image, in one embodiment. Since each pixel in the 3D image may be associated with a unique (u, v) coordinate, step 504 determines a plane equation for various (u, v) coordinates.

FIG. 5B shows details of one embodiment of determining the plane equations. A depth camera 20 is used to generate a depth image as discussed in step 502. The (x,y,z) coordinate system depicted in FIG. 5B is for an x-y plane in which the touch region 11 will be defined. Thus, note that the depth image generated by the depth camera 20 typically will have a different coordinate system. Also note that reference to the (x,y,z) coordinate system is to facilitate discussion. The touch region 11 may be defined by more than one plane.

As noted above, the pixels of the depth image may be defined in terms of (u, v) coordinates, and a depth value. Thus, each pixel in the depth value may be assigned a 3D position, with respect to some coordinate system (not necessarily the x,y,z system in FIG. 5B). A few of the pixels 501 whose 3D location puts them on the touch region 11 are represented as dots in the plane of the touch region 11. Only a few pixels 501 are depicted so as to not obscure the diagram. A normal line 502 is depicted from one of the depth pixels 501. The normal line 502 for a given pixel is the line that is perpendicular to a plane defined by that pixel 501 and a few of its neighbors. Cross products between the pixel 501 and its neighbors may be used to determine the normal line 502. Thus, the plane equation for a depth pixel 501 may be defined as that depth pixel's 3D coordinate and the normal line 502.

In step 506, a touch region 11 is determined. The touch region 11 may be defined as a quad shaped region that has about the same shape as the display 96. The quad could be larger than, smaller than, or the same size as the display 96. It is not required that the touch region 11 be the same shape as the display 96. Also, as noted above, there might be two separate touch regions 11. Each region could be used to control the entire display screen 96. Alternately, each touch region 11 could control separate parts of the display 96.

In FIG. 5B, the x-y coordinates may be correlated to an x-y coordinate system associated with the display 96. The x-y coordinate system of the display 96 may be correlated to the resolution (e.g., 1280×800, 1280×960, 1280×720, 1024×768, etc.). Since display parameters such as resolution may be adjustable, the mapping between the touch region 11 and the display 96 may change in response to changes in display parameters.

In one embodiment, rather than determining the touch region 11 during a calibration period, the touch region 11 is determined more or less continuously. FIG. 5C is a flowchart of one embodiment of a process 520 of defining a touch region 11 at any time. Process 520 is one embodiment of step 402. The touch region 11 could be determined with each new 3D image frame, or some other frequency. In step 522, a 3D image frame is accessed. A depth cloud model may be generated for the 3D image. Depth cloud models are discussed more fully below. Briefly, a depth cloud model may be formed by determining a 3D coordinate for each pixel in the depth image.

In step 524, a plane equation is determined for three random points in the 3D image. The plane equation may be determined by taking a cross product based on the locations of the three points. These three points may not end up being on the actual surface of the table 9, so this plane equation will not necessarily be used in the end.

In step 526, the plane equation is placed into a bucket. Plane equations that represent planes that coincide (or at least are close to coinciding) with each other may be placed in the same bucket. Steps 524 and 526 are repeated for other sets of three random points, until all desired points are analyzes (step 527). The plane of the table 9 can be determined fairly quickly. Note that even is the user has their hands over the table 9, this technique can find the plane of the table 9. Thus, note that the image data can also be used to determine the location of the user's hands relative to the table 9.

In step 528, the touch region 11 is defined. In one embodiment, all of the groups of three random points that ended up in one of the buckets are determined to be on the plane having the touch region 11. The bucket may be identified as the one with most of the points, in one embodiment.

Figure 5D:
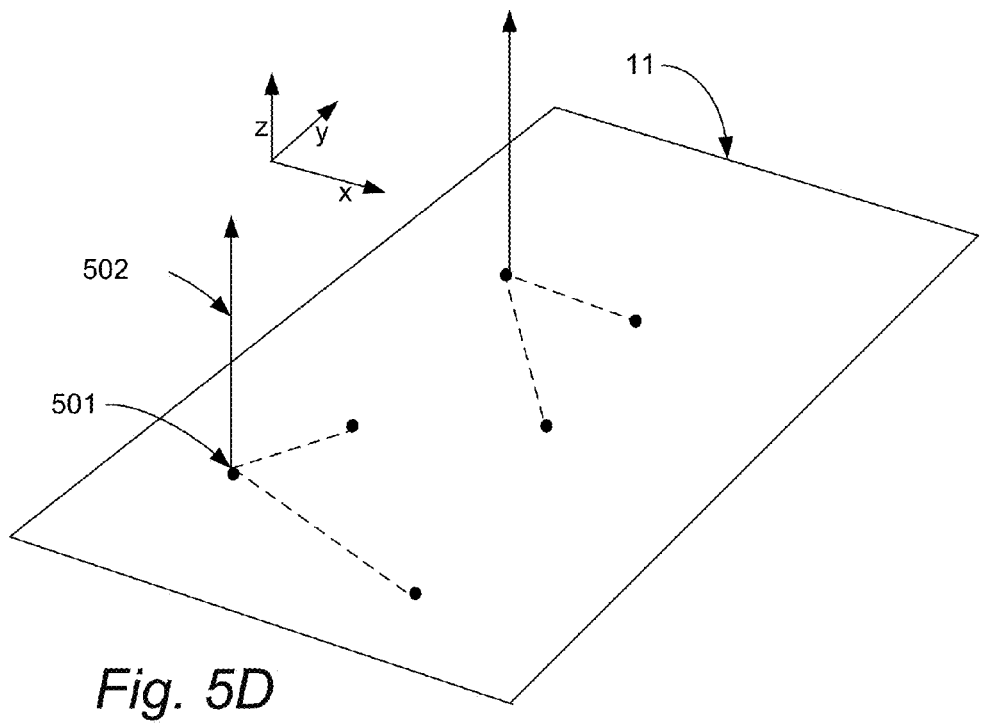
FIG. 5D shows details of one embodiment of determining a touch region.
Figure 5C:
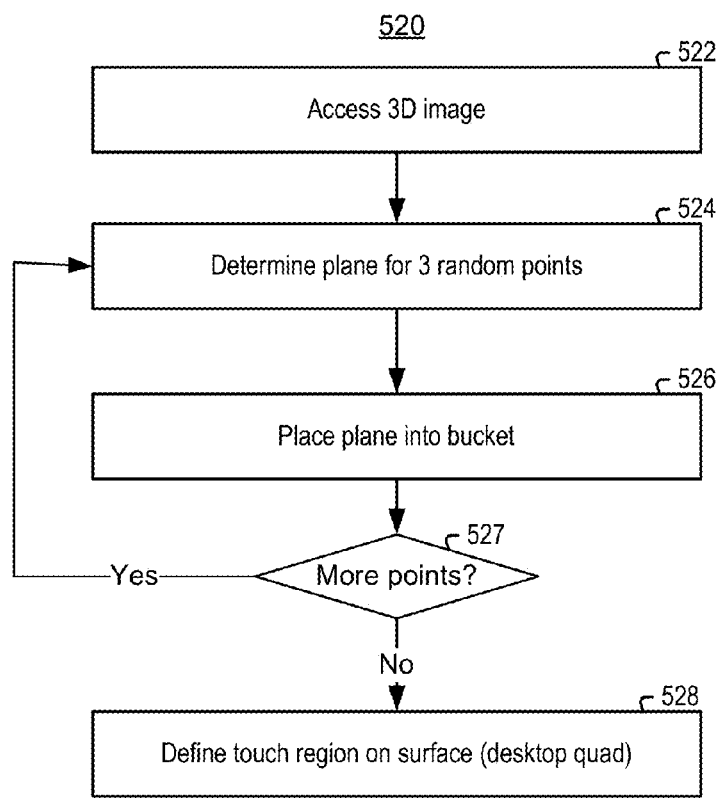
FIG. 5C is a flowchart of one embodiment of a process of defining a touch region.

FIG. 5D shows an example of one embodiment of determining a touch region 11 based on groups of three random points. Two sets of three random points are shown with a normal line 502 for each set. During process 520 many sets of three random points should fall into roughly the same plane. Those sets that do not are eventually discarded. The touch region 11 may be defined as some quad within the plane that was determined.

Figure 6A:
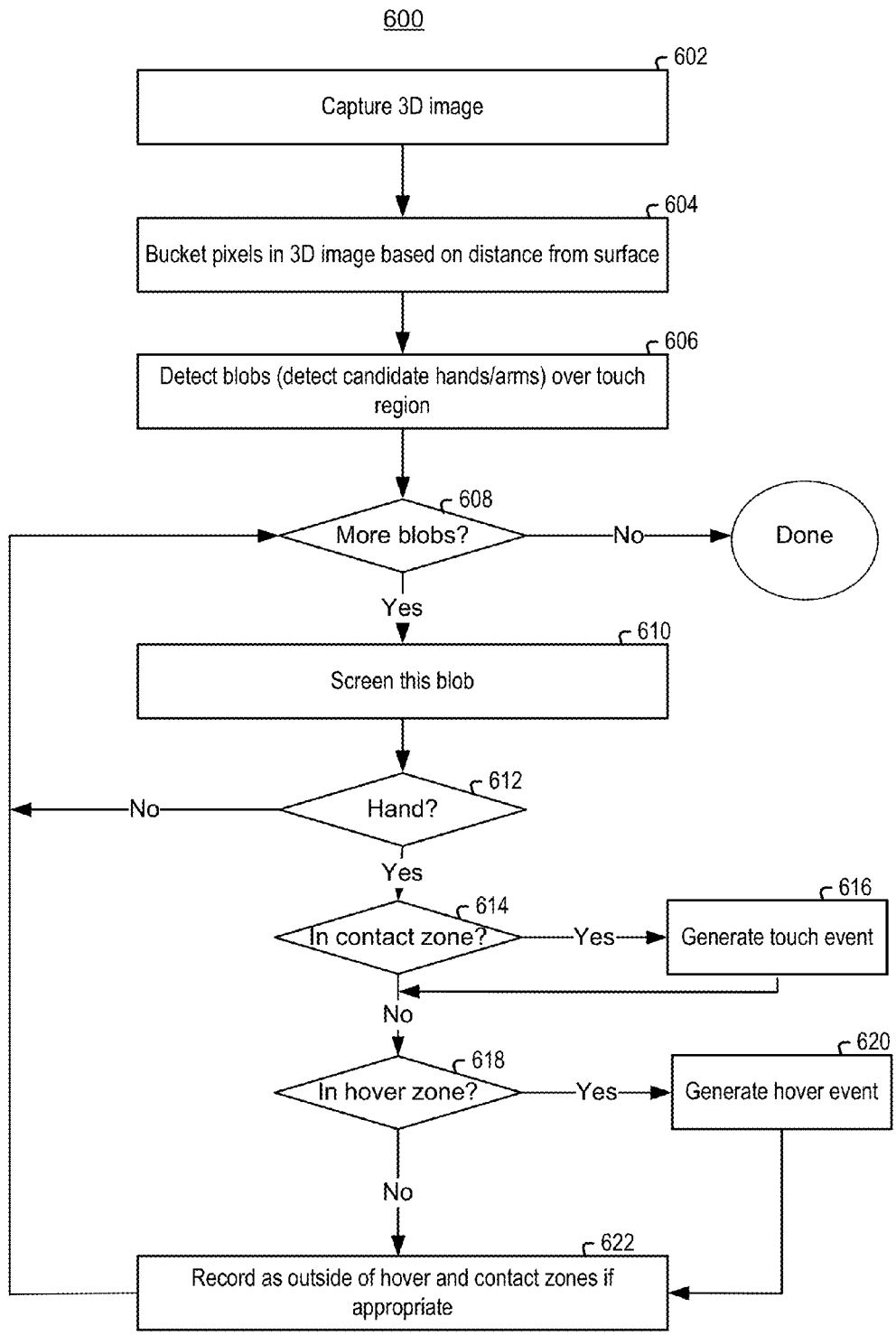
FIG. 6A is a flowchart of one embodiment of a process of identifying a user's hands and the relative position of the hand to the touch region.

FIG. 6A is a flowchart of one embodiment of a process 600 of identifying a user's hands and the relative position of the hand to the touch region 11. Process 600 is one embodiment of steps 404 and 406 from FIG. 4A.

In step 602, 3D image data is captured by the capture device 20. In one embodiment, process 600 is performed after the touch region 11 has been identified. Thus, the image data used during process 600 may be collected after the image data used to determine the touch region 11. Also, since the touch region 11 has been determined, this region (and other parts of the surface such as the table) may be classified as background. In one embodiment, the same image data is used to determine the touch region 11 and the user's hands. Process 500 may be used to identify the touch region 11 prior to step 602. In one embodiment, the same image data that is used to identify the touch region 11 is used in process 60. Process 520 may be used to identify the touch region 11 using the same image data as is used in process 600.

In step 604, the depth pixels in the depth image are place into different buckets based on their distance from the surface (e.g., table 9). In one embodiment, there are buckets for background pixels, touch pixels, and hover pixels. Background pixels may be all pixels that are considered to be on the surface. Touch pixels may be all that are within a certain distance of the surface, but not actually on the surface. For example, touch pixels may be those within about 5 mm from the surface, but not on the surface. Hover pixels may be those that are further from the surface than touch pixels, but within still within some pre-defined range. For example, hover pixels may be those further than 5 mm but less than 6 cm from the surface.

As noted herein, each pixel in the depth image is associated with a unique (u, v) coordinate, in one embodiment. Each depth pixel from the depth image may be processed by looking up the plane equation that was previously determined for that (u, v) coordinate. Based on that plane equation the distance from the depth pixel and the plane may be determined. Thus, in effect, each depth pixel is assigned a distance to the surface.

Figure 6B:
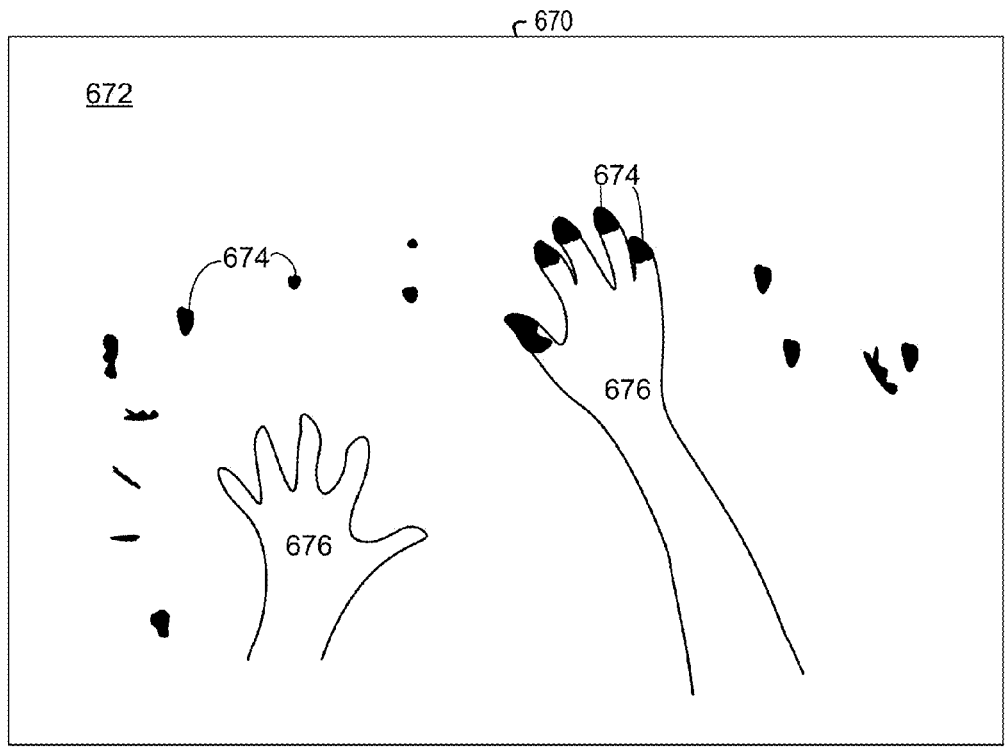
FIG. 6B shows an example distance map that is formed by placing depth pixels into buckets.

FIG. 6B shows an example distance map 670 that is formed by placing the depth pixels into the buckets. Each pixel in the distance map 670 is placed into either a background bucket 672, contact bucket 674, or hover bucket 676. The user's left hand is mostly in the hover zone 47. Therefore, the depth pixels for the left hand are mostly placed into the hover bucket 676. Much of the user's right hand is in the hover zone 47. However, some of the fingertips are in the contact zone 45. Therefore, many of the depth pixels for the right hand are placed into the hover bucket 672. However, some are placed into the contact bucket 674. There are some random groups of pixels elsewhere on the surface that are also determined to be in the contact zone 45, and thus placed into the contact bucket 674 at least for the time being. Most of the pixels in the depth image are placed into the background bucket 672 in the example of FIG. 6B.

In step 606 of FIG. 6A, candidate "blobs" are detected in the 3D image data. A "blob" may be defined as a group of pixels that seem to be part of the same object based on their location and depth values. In one embodiment, first background pixels are identified. Thus, only pixels in the foreground (foreground may be anything closer to the depth camera than background) need to be analyzed in step 606. In one embodiment, a series of floodfills are performed in step 606.

After identifying a number of candidate blobs, each blob may be processed in turn in following steps. Step 608 is a test to determine whether there are more blobs to process. In step 610, the present candidate blob is screened to determine whether it is an interesting object such as an arm, hand, finger, etc. For example, if a blob is too large or too small it may be rejected. If the blob is too large it may indicate an invalid frame, in which case the frame may be discarded. Blobs that are too small may indicate random noise, which may be ignored. If a blob has too many holes to be of interest, it may be rejected. If the blob is rejected (step 612), then processing returns to step 608.

If the blob is not rejected, then it is processed in further steps. In one embodiment, blobs that are determined to include a hand are processed (see step 612). However, other criteria could be used. It is not required that the screening be for a body part. As one alternative, a user may use some object to provide the user input. Any object could be used, such as a pen, pencil, etc.

In one embodiment, a point cloud model is developed for a blob that is to be analyzed further. However, note that the point cloud model could be determined earlier. The point cloud model may be a 3D model in which each depth pixel in the depth image is assigned a coordinate in 3D space. The point cloud may have one point for each depth pixel in the depth image, but that is not an absolute requirement. In one embodiment, each point in the point cloud is a volumetric pixel or "voxel". To facilitate discussion, it will be assumed that each voxel in the point cloud has a corresponding depth pixel in the depth image. However, note that this one-to-one correspondence is not a requirement.

Figure 6D:
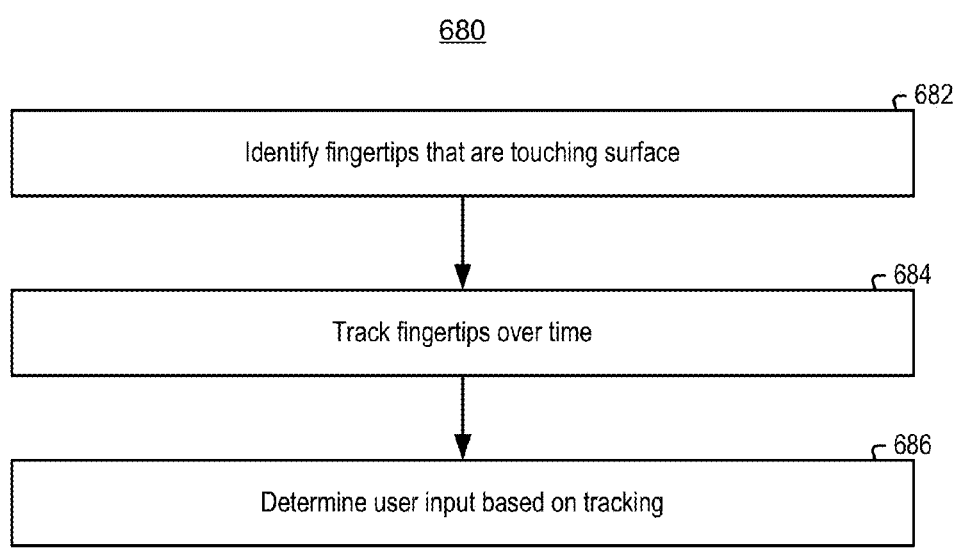
FIG. 6D shows a flowchart of one embodiment of a process of tracking fingertips.
Figure 6C:
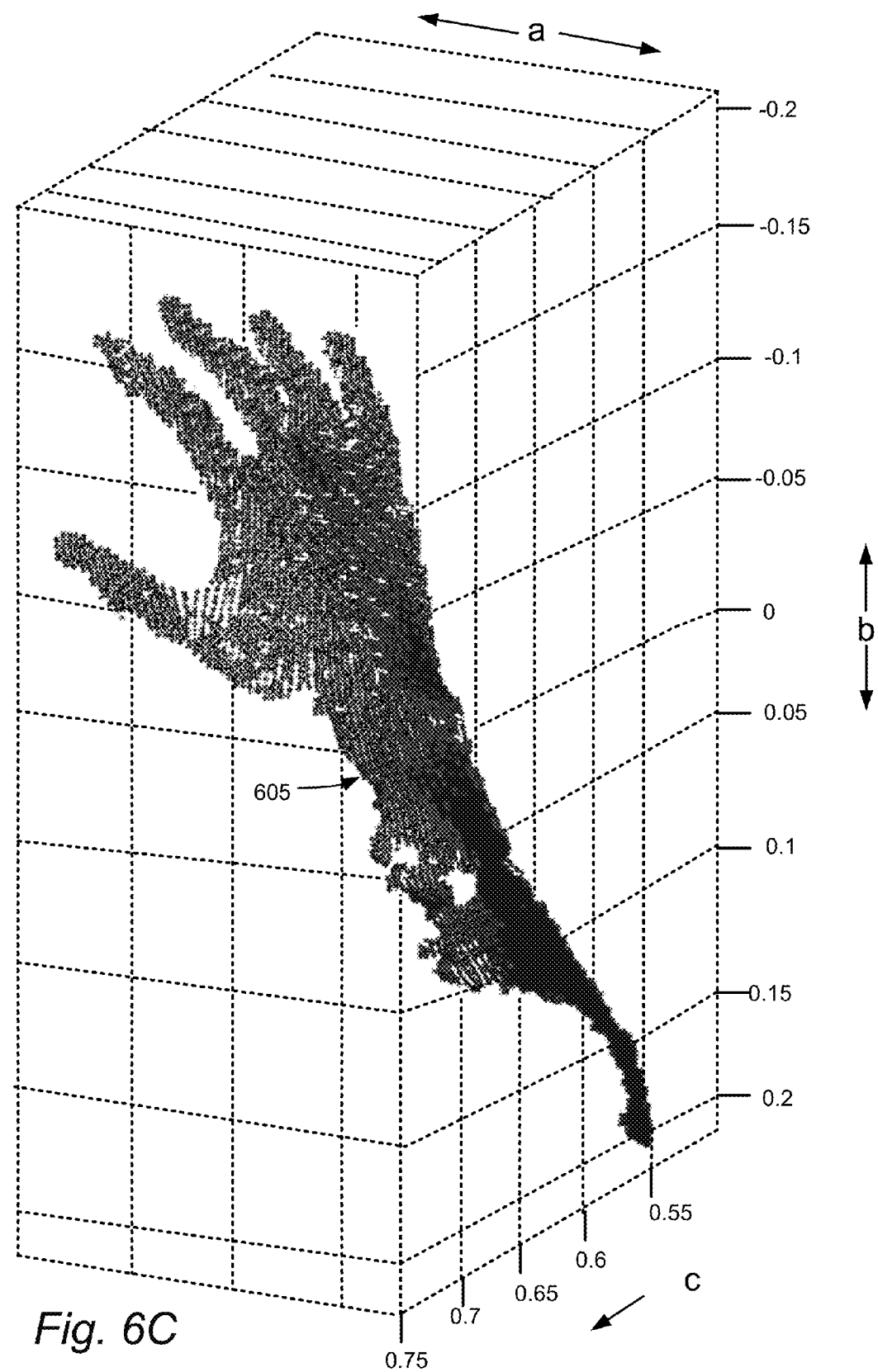
FIG. 6C depicts a point cloud model of a hand and portion of an arm.

FIG. 6C depicts a point cloud model 605 of a hand and portion of an arm. The point cloud model 605 is depicted within an (a, b, c) coordinate system. Thus, an a-axis, b-axis, and c-axis of a coordinate system are depicted. In some embodiments, two of the axes in the coordinate system correspond to the u-axis and v-axis of the depth image. However, this correspondence is not a requirement. The position along the third axis in the global coordinate system may be determined based on the depth value for a depth pixel in the depth map. Note that the point cloud model 605 may be generated in another manner.

In step 614 of FIG. 6A, the system determines whether at least a portion of the user's hand is within a contact zone 45. In one embodiment, the system may determine whether a portion of the blob is within a contact zone 45. In one embodiment, the system tracks fingertips and determines whether a fingertip is in the contact zone 45. Further details are discussed below.

If a part of the hand is within the contact zone 45, then a touch event is generated, in one embodiment, in step 616. Step 616 may include rendering the fingertips in a manner that shows the user that they are in contact, or selecting an element. Step 616 may also include receiving a selection as input to the electronic device. Further details are discussed below. After step 614 or 616, processing continues to step 618.

In step 618, a determination is made whether a hand is within the hover zone 47. The hover zone 47 may be defined as being within a certain distance away from the surface of the touch region 11. If a hand is in the hover zone 47, a hover event is generated, in one embodiment in step 620. Step 620 may include rendering the portion of the hands that are in the hover zone in a manner that shows the user that they are in the hover zone. The hover event may also be user input to the electronic device. As noted above, a user hovering may indicate interest or focus, but not commitment, to an element on the display. Further details are discussed below. After step 618 or 620, processing continues to step 622.

If the hand is not in either the contact zone 45 or the hover zone 47, then the hand is noted as being outside of the contact and hover zones, in step 622. This information is noted such that feedback can be presented on the display 96 showing the user the position of their hand even though it is outside of the contact and hover zones 45, 47. The process 600 may then return to step 608 to determine whether there are more blobs to process.

FIG. 6D shows a flowchart of one embodiment of a process 680 of tracking fingertips. Tracking fingertips may be performed when it is determined that there is a blob within the contact zone 45. Process 680 may be performed when it is determined that a part of the hand is in the contact zone 45, in step 614 of process 600. In step 682, portions of the hand that are touching the touch region 11 are detected. In one embodiment, touch blobs are detected in step 682. In one embodiment, a series of floodfills are performed to identify fingertip blobs that are in the contact zone 45. These floodfills work only with pixels that were identified as being part of a hand/arm blob in one embodiment. This prevents random pixels that are not associated with the user's hand from being falsely identified as a touch point. Referring back to FIG. 6B, only those pixels in the distance map 670 that were placed into a contact zone bucket 674 and that are part of a hand are identified as a touch point.

In one embodiment, each of these touch blobs is identified as a specific finger and hand. For example, a given touch blob may be identified as being part of the right index finger. This information may be used later on to allow the user to enter input that depends on which finger and/or hand is being used. However, note that identification of a specific finger/hand may be performed at some other time.

When determining whether a blob is within the contact zone 45, processing may proceed on a voxel by voxel basis. Thus, step 682 may determine whether any point in the point cloud 605 that represents the blob is within the contact zone 45.

Step 682 analyzes one image frame at a time, in one embodiment. Step 682 may be repeated for each new image frame. In step 684, the fingertip blobs are tracked over time. Thus, step 684 processes many different image frames. Step 684 may include matching a fingertip blob from one frame to the next. Note that it is not required that the specific hand/finger be identified for each fingertip blob as previously mentioned. In one embodiment, energy minimization is used to match fingertip blobs from the present frame to one or more past frames.

In step 686, user input is determined based on the tracking of the fingertip blobs. In one embodiment, the x-y coordinate in the touch region 11 of one or more fingertips is tracked over time. In one embodiment, the number of fingertips that are moving in the touch region 11 determines the type of user input. For example, one finger being moved may indicate that the user wants to move an element on the display 96. If two fingers are being moved at the same time, this may indicate that the user wants to zoom in or zoom out. One type of zooming is to change the size of what is being rendered. For example, a user might want to zoom in or out of a map. Another type of zooming is to move to a higher or lower level in a directory. For example, the user could spread apart their fingers to indicate that they want to see files or other information in the next directory down. As another example, moving their fingers apart could be used to signal that a folder should be opened to reveal its contents. Moving fingers together could indicate that the folder should be closed, or that the user desires to go up (or back) one level in the hierarchy.

In one embodiment, the user input depends on which hand and/or fingers they are using. Note that unlike some conventional touch interfaces, the touch interface of embodiments is able to determine which hand and finger the user is using. For example, the user might pinch together the thumb and finger (of either hand) versus pinching together a finger of one hand towards a finger on the other hand. To some conventional touch interfaces, these actions cannot be distinguished. However, in one embodiment, a different user input is assigned for these two different user actions. Many other possibilities exist for providing for user input that depends on which hand and/or fingers are being used.

One type of user input is a selection of an element being presented on the display 96. The selection could be indicated by the user simply touching the element. There could be a parameter that defines how long the user should touch the element for this to be considered as a selection. The selection could also be indicated by the user tapping one or more times. For example, the user could simply tap an element to select it. Alternatively, the selection could be indicated by a double tap. Many other types of input can be used.

Note that FIG. 6D described an example in which fingertip blobs were tracked. However, other objects could be tracked. As noted, it is not required that a body part be used to provide the touch input. For example, a user might employ an object such as a pen to interact with the touch region 11. In this example, the portions of the pen that are in the contact zone can be tracked over time to determine the user input.

Figure 7:
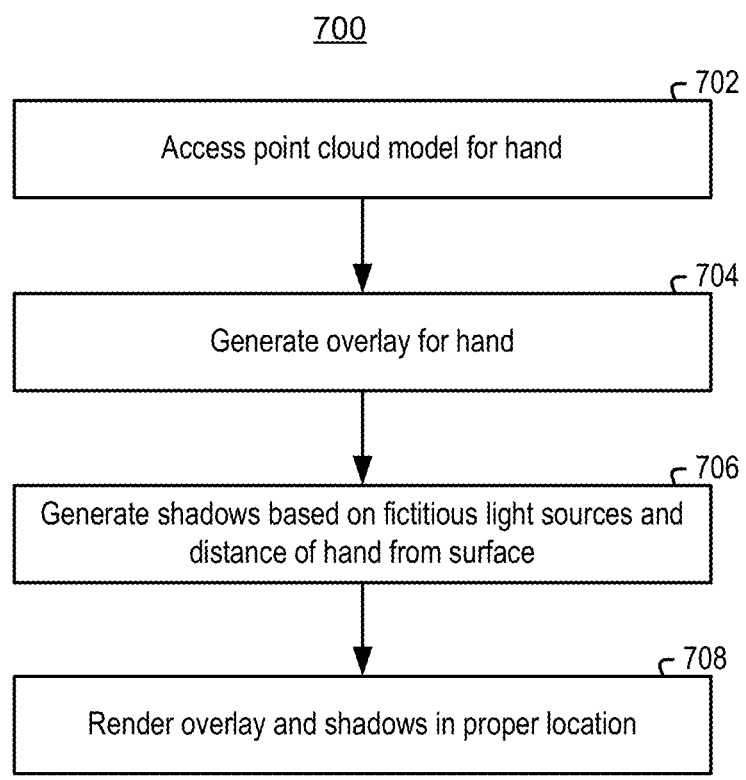
FIG. 7 is a flowchart of one embodiment of a process of rendering the user input element and shadows.

FIG. 7 is a flowchart of one embodiment of a process 700 of rendering the user input element 18 and shadows 21. In step 702, a point cloud model 605 for the hand is accessed. In one embodiment, each pixel in the point cloud model 605 is processed based on its depth value such that further rendering steps can produce an image such as the example of FIG. 1C. As discussed in that example, the user input element 18 may have a transparent inner portion 13, and edges 15, 17. Some of the edges can be highlighted to show the user that these are touch points 15.

In step 704, data for rendering the user input element 18 is generated. Step 704 may include one or more blending, shading, and other graphics processing steps. In one embodiment, each pixel in the point cloud model 605 is represented as a circle or sphere whose diameter depends on the distance of the pixel from the touch region 11. In one embodiment, the diameter of the circle is larger the farther away it is from the touch region 11. Having the circles get larger as the hand is further from the touch region 11 results in greater blurring of the underlying image, in one embodiment. This provides the user with a visual cue that they are further away from interacting with the touch region 11.

In one embodiment, the processing of step 704 performs a blending operation such that the circles get blended. This produces an intermediate image in which the inner portion 13 and edges 15, 17 have different brightness levels. Thus, the transparent inner portion 13 can easily be identified to determine what regions should have various effects associated with the inner portion 13, such as distortion. Also, the touch edges 15 can easily be identified such that data for rendering them as highlights may be generated. In one embodiment, the intermediate image is input into a shader.

In step 706, shadows 21a, 21b for the user input element 18 are generated. In one embodiment, the shadows are defined based on two fictitious light sources. These fictitious light sources can be used to generate data to represent shadows of the user's hands in the touch region 11. As one example, the fictitious light sources may be at about a 45 degree angle with respect to the touch region 11. As noted above, each pixel in the point cloud model 605 may be represented as a circle or similar object. In one embodiment, the light sources are projected through these circles onto the plane of the touch region 11 to generate data for shadows 21a, 21b.

In step 708, the user input element 18 and the shadows 21a, 21b are rendered on the display 96 in the proper location. Note that step 708 may include correlating an x-y coordinate system of the touch region 11 to an x-y coordinate of the display 96. The x-y coordinate of the display 96 may be defined based on the display resolution (e.g., 1280×600, etc.). Rendering of both the input object 18 and the shadows 21a, 21b may include blending data that represents those objects with data that represents whatever is being rendered on the display 96.

As noted, the display 96 may be associated with an HMD 2. The following provides further details of HMDs 2. FIG. 8A is a side view of an eyeglass temple 102 of the frame 115 in an eyeglasses embodiment of a see-through, mixed reality display device. At the front of frame 115 is physical environment facing video camera 113 that can capture video and still images. Particularly in some embodiments, physical environment facing camera 113 may be a depth camera as well as a visible light or RGB camera. For example, the depth camera may include an IR illuminator transmitter and a hot reflecting surface like a hot mirror in front of the visible image sensor which lets the visible light pass and directs reflected IR radiation within a wavelength range or about a predetermined wavelength transmitted by the illuminator to a CCD or other type of depth sensor. Other types of visible light camera (RGB camera) and depth cameras can be used. More information about depth cameras can be found in U.S. Published Patent Application 2011/0307260, filed on Jun. 11, 2010, incorporated herein by reference in its entirety. The data from the sensors may be sent to a processor 210 of the control circuitry 136, or the processing unit 4, 5 or both which may process them but which the unit 4,5 may also send to a computer system over a network or hub computing system 12 for processing. The processing identifies objects through image segmentation and edge detection techniques and maps depth to the objects in the user's real world field of view. Additionally, the physical environment facing camera 113 may also include a light meter for measuring ambient light.

Control circuits 136 provide various electronics that support the other components of head mounted display device 2. More details of control circuits 136 are provided below with respect to FIG. 10A. Inside, or mounted to temple 102, are ear phones 130, inertial sensors 132, GPS transceiver 144 and temperature sensor 138. In one embodiment inertial sensors 132 include a three axis magnetometer 132A, three axis gyro 132B and three axis accelerometer 132C (See FIG. 10A). The inertial sensors are for sensing position, orientation, and sudden accelerations of head mounted display device 2. From these movements, head position may also be determined.

The display device 2 provides an image generation unit which can create one or more images including one or more virtual objects. In some embodiments a microdisplay may be used as the image generation unit. A microdisplay assembly 173 in this example comprises light processing elements and a variable focus adjuster 135. An example of a light processing element is a microdisplay unit 120. Other examples include one or more optical elements such as one or more lenses of a lens system 122 and one or more reflecting elements such as surfaces 124a and 124b in FIGS. 9A and 9B or 124 in FIGS. 9C and 9D. Lens system 122 may comprise a single lens or a plurality of lenses.

Mounted to or inside temple 102, the microdisplay unit 120 includes an image source and generates an image of a virtual object. The microdisplay unit 120 is optically aligned with the lens system 122 and the reflecting surface 124 or reflecting surfaces 124a and 124b as illustrated in the following Figures. The optical alignment may be along an optical axis 133 or an optical path 133 including one or more optical axes. The microdisplay unit 120 projects the image of the virtual object through lens system 122, which may direct the image light, onto reflecting element 124 which directs the light into lightguide optical element 112 as in FIGS. 9C and 9D or onto reflecting surface 124a (e.g. a mirror or other surface) which directs the light of the virtual image to a partially reflecting element 124b which combines the virtual image view along path 133 with the natural or actual direct view along the optical axis 142 as in FIGS. 9A-9D. The combination of views are directed into a user's eye.

The variable focus adjuster 135 changes the displacement between one or more light processing elements in the optical path of the microdisplay assembly or an optical power of an element in the microdisplay assembly. The optical power of a lens is defined as the reciprocal of its focal length, e.g. 1/focal length, so a change in one affects the other. The change in focal length results in a change in the region of the field of view, e.g. a region at a certain distance, which is in focus for an image generated by the microdisplay assembly 173.

In one example of the microdisplay assembly 173 making displacement changes, the displacement changes are guided within an armature 137 supporting at least one light processing element such as the lens system 122 and the microdisplay 120 in this example. The armature 137 helps stabilize the alignment along the optical path 133 during physical movement of the elements to achieve a selected displacement or optical power. In some examples, the adjuster 135 may move one or more optical elements such as a lens in lens system 122 within the armature 137. In other examples, the armature may have grooves or space in the area around a light processing element so it slides over the element, for example, microdisplay 120, without moving the light processing element. Another element in the armature such as the lens system 122 is attached so that the system 122 or a lens within slides or moves with the moving armature 137. The displacement range is typically on the order of a few millimeters (mm). In one example, the range is 1-2 mm. In other examples, the armature 137 may provide support to the lens system 122 for focal adjustment techniques involving adjustment of other physical parameters than displacement. An example of such a parameter is polarization.

For more information on adjusting a focal distance of a microdisplay assembly, see U.S. patent Ser. No. 12/941,825 entitled "Automatic Variable Virtual Focus for Augmented Reality Displays," filed Nov. 8, 2010, having inventors Avi Bar-Zeev and John Lewis and which is hereby incorporated by reference.

In one example, the adjuster 135 may be an actuator such as a piezoelectric motor. Other technologies for the actuator may also be used and some examples of such technologies are a voice coil formed of a coil and a permanent magnet, a magnetostriction element, and an electrostriction element.

There are different image generation technologies that can be used to implement microdisplay 120. For example, microdisplay 120 can be implemented using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and Mirasol® display technology from Qualcomm, Inc. are all examples of reflective technologies which are efficient as most energy is reflected away from the modulated structure and may be used in the system described herein. Additionally, microdisplay 120 can be implemented using an emissive technology where light is generated by the display. For example, a PicoP™ engine from Microvision, Inc. emits a laser signal with a micro mirror steering either onto a tiny screen that acts as a transmissive element or beamed directly into the eye (e.g., laser).

As mentioned above, the configuration of the light processing elements of the microdisplay assembly 173 create a focal distance or focal region in which a virtual object appears in an image. Changing the configuration changes the focal region for the virtual object image. The focal region determined by the light processing elements can be determined and changed based on the equation $1/S1+1/S2=1/f$.

The symbol f represents the focal length of a lens such as lens system 122 in the microdisplay assembly 173. The lens system 122 has a front nodal point and a rear nodal point. If light rays are directed toward either nodal point at a given angle relative to the optical axis, the light rays will emerge from the other nodal point at an equivalent angle relative to the optical axis. In one example, the rear nodal point of lens system 122 would be between itself and the microdisplay 120. The distance from the rear nodal point to the microdisplay 120 may be denoted as S2. The front nodal point is typically within a few mm of lens system 122. The target location is the location of the virtual object image to be generated by the microdisplay 120 in a three-dimensional physical space. The distance from the front nodal point to the target location of the virtual image may be denoted as S1. Since the image is to be a virtual image appearing on the same side of the lens as the microdisplay 120, sign conventions give that S1 has a negative value.

If the focal length of the lens is fixed, S1 and S2 are varied to focus virtual objects at different depths. For example, an initial position may have S1 set to infinity, and S2 equal to the focal length of lens system 122. Assuming lens system 122 has a focal length of 10 mm, consider an example in which the virtual object is to be placed about 1 foot or 300 mm into the user's field of view. S1 is now about −300 mm, f is 10 mm and S2 is set currently at the initial position of the focal length, 10 mm, meaning the rear nodal point of lens system 122 is 10 mm from the microdisplay 120. The new distance or new displacement between the lens 122 and microdisplay 120 is determined based on $1/(-300)+1/S2=1/10$ with all in units of mm. The result is about 9.67 mm for S2.

In one example, one or more processors such as in the control circuitry, the processing unit 4, 5 or both can calculate the displacement values for S1 and S2, leaving the focal length f fixed and cause the control circuitry 136 to cause a variable adjuster driver 237 (see FIG. 10A) to send drive signals to have the variable virtual focus adjuster 135 move the lens system 122 along the optical path 133 for example. In other embodiments, the microdisplay unit 120 may be moved instead or in addition to moving the lens system 122. In other embodiments, the focal length of at least one lens in the lens system 122 may be changed instead or with changes in the displacement along the optical path 133 as well.

FIG. 8B is a side view of an eyeglass temple in another embodiment of a mixed reality display device providing support for hardware and software components and three dimensional adjustment of a microdisplay assembly. Some of the numerals illustrated in the FIG. 8A above have been removed to avoid clutter in the drawing. In embodiments where the display optical system 14 is moved in any of three dimensions, the optical elements represented by reflecting surface 124 and the other elements of the microdisplay assembly 173, e.g. 120, 122 may also be moved for maintaining the optical path 133 of the light of a virtual image to the display optical system. An XYZ transport mechanism in this example made up of one or more motors represented by motor block 203 and shafts 205 under control of the processor 210 of control circuitry 136 (see FIG. 10A) control movement of the elements of the microdisplay assembly 173. An example of motors which may be used are piezoelectric motors. In the illustrated example, one motor is attached to the armature 137 and moves the variable focus adjuster 135 as well, and another representative motor 203 controls the movement of the reflecting element 124.

FIG. 9A is a top view of an embodiment of a movable display optical system 14 of a see-through, near-eye, mixed reality device 2 including an arrangement of gaze detection elements. A portion of the frame 115 of the near-eye display device 2 will surround a display optical system 14 and provides support for elements of an embodiment of a microdisplay assembly 173 including microdisplay 120 and its accompanying elements as illustrated. In order to show the components of the display system 14, in this case 14r for the right eye system, a top portion of the frame 115 surrounding the display optical system is not depicted. Additionally, the microphone 110 in bridge 104 is not shown in this view to focus attention on the operation of the display adjustment mechanism 203. As in the example of FIG. 4C, the display optical system 14 in this embodiment is moved by moving an inner frame 117r, which in this example surrounds the microdisplay assembly 173 as well. The display adjustment mechanism is embodied in this embodiment as three axis motors 203 which attach their shafts 205 to inner frame 117r to translate the display optical system 14, which in this embodiment includes the microdisplay assembly 173, in any of three dimensions as denoted by symbol 144 indicating three (3) axes of movement.

The display optical system 14 in this embodiment has an optical axis 142 and includes a see-through lens 118 allowing the user an actual direct view of the real world. In this example, the see-through lens 118 is a standard lens used in eye glasses and can be made to any prescription (including no prescription). In another embodiment, see-through lens 118 can be replaced by a variable prescription lens. In some embodiments, see-through, near-eye display device 2 will include additional lenses.

The display optical system 14 further comprises reflecting surfaces 124a and 124b. In this embodiment, light from the microdisplay 120 is directed along optical path 133 via a reflecting element 124a to a partially reflective element 124b embedded in lens 118 which combines the virtual object image view traveling along optical path 133 with the natural or actual direct view along the optical axis 142 so that the combined views are directed into a user's eye, right one in this example, at the optical axis, the position with the most collimated light for a clearest view.

A detection area 139r of a light sensor is also part of the display optical system 14r. An optical element 125 embodies the detection area 139r by capturing reflected light from the user's eye received along the optical axis 142 and directs the captured light to the sensor 134r, in this example positioned in the lens 118 within the inner frame 117r. As shown, the arrangement allows the detection area 139 of the sensor 134r to have its center aligned with the center of the display optical system 14. For example, if sensor 134r is an image sensor, sensor 134r captures the detection area 139, so an image captured at the image sensor is centered on the optical axis because the detection area 139 is. In one example, sensor 134r is a visible light camera or a combination of RGB/IR camera, and the optical element 125 includes an optical element which reflects visible light reflected from the user's eye, for example a partially reflective mirror.

In other embodiments, the sensor 134r is an IR sensitive device such as an IR camera, and the element 125 includes a hot reflecting surface which lets visible light pass through it and reflects IR radiation to the sensor 134r. An IR camera may capture not only glints, but also an infra-red or near infra-red image of the user's eye including the pupil.

In other embodiments, the IR sensor device 134r is a position sensitive device (PSD), sometimes referred to as an optical position sensor. The position of detected light on the surface of the sensor is identified. A PSD can be selected which is sensitive to a wavelength range or about a predetermined wavelength of IR illuminators for the glints. When light within the wavelength range or about the predetermined wavelength of the position sensitive device is detected on the sensor or light sensitive portion of the device, an electrical signal is generated which identifies the location on the surface of the detector. In some embodiments, the surface of a PSD is divided into discrete sensors like pixels from which the location of the light can be determined. In other examples, a PSD isotropic sensor may be used in which a change in local resistance on the surface can be used to identify the location of the light spot on the PSD. Other embodiments of PSDs may also be used. By operating the illuminators 153 in a predetermined sequence, the location of the reflection of glints on the PSD can be identified and hence related back to their location on a cornea surface.

The depiction of the light directing elements, in this case reflecting elements, 125, 124, 124a and 124b in FIGS. 9A-6D are representative of their functions. The elements may take any number of forms and be implemented with one or more optical components in one or more arrangements for directing light to its intended destination such as a camera sensor or a user's eye. As shown, the arrangement allows the detection area 139 of the sensor to have its center aligned with the center of the display optical system 14. The image sensor 134r captures the detection area 139, so an image captured at the image sensor is centered on the optical axis because the detection area 139 is.

When the user is looking straight ahead, and the center of the user's pupil is centered in an image captured of the user's eye when a detection area 139 or an image sensor 134r is effectively centered on the optical axis of the display, the display optical system 14r is aligned with the pupil. When both display optical systems 14 are aligned with their respective pupils, the distance between the optical centers matches or is aligned with the user's inter-pupillary distance. In the example of FIG. 9A, the inter-pupillary distance can be aligned with the display optical systems 14 in three dimensions.

In one embodiment, if the data captured by the sensor 134 indicates the pupil is not aligned with the optical axis, one or more processors in the processing unit 4, 5 or the control circuitry 136 or both use a mapping criteria which correlates a distance or length measurement unit to a pixel or other discrete unit or area of the image for determining how far off the center of the pupil is from the optical axis 142. Based on the distance determined, the one or more processors determine adjustments of how much distance and in which direction the display optical system 14r is to be moved to align the optical axis 142 with the pupil. Control signals are applied by one or more display adjustment mechanism drivers 245 to each of the components, e.g. motors 203, making up one or more display adjustment mechanisms 203. In the case of motors in this example, the motors move their shafts 205 to move the inner frame 117r in at least one direction indicated by the control signals. On the temple side of the inner frame 117r are flexible sections 215a, 215b of the frame 115 which are attached to the inner frame 117r at one end and slide within grooves 217a and 217b within the interior of the temple frame 115 to anchor the inner frame 117 to the frame 115 as the display optical system 14 is move in any of three directions for width, height or depth changes with respect to the respective pupil.

In addition to the sensor, the display optical system 14 includes other gaze detection elements. In this embodiment, attached to frame 117r on the sides of lens 118, are at least two (2) but may be more, infra-red (IR) illuminating devices 153 which direct narrow infra-red light beams within a particular wavelength range or about a predetermined wavelength at the user's eye to each generate a respective glint on a surface of the respective cornea. In other embodiments, the illuminators and any photodiodes may be on the lenses, for example at the corners or edges. In this embodiment, in addition to the at least 2 infra-red (IR) illuminating devices 153 are IR photodetectors 152. Each photodetector 152 is sensitive to IR radiation within the particular wavelength range of its corresponding IR illuminator 153 across the lens 118 and is positioned to detect a respective glint. As shown in FIGS. 4A-4C, the illuminator and photodetector are separated by a barrier 154 so that incident IR light from the illuminator 153 does not interfere with reflected IR light being received at the photodetector 152. In the case where the sensor 134 is an IR sensor, the photodetectors 152 may not be needed or may be an additional glint data capture source. With a visible light camera, the photodetectors 152 capture light from glints and generate glint intensity values.

In FIGS. 9A-9D, the positions of the gaze detection elements, e.g. the detection area 139 and the illuminators 153 and photodetectors 152 are fixed with respect to the optical axis of the display optical system 14. These elements may move with the display optical system 14r, and hence its optical axis, on the inner frame, but their spatial relationship to the optical axis 142 does not change.

FIG. 9B is a top view of another embodiment of a movable display optical system of a see-through, near-eye, mixed reality device including an arrangement of gaze detection elements. In this embodiment, light sensor 134r may be embodied as a visible light camera, sometimes referred to as an RGB camera, or it may be embodied as an IR camera or a camera capable of processing light in both the visible and IR ranges, e.g. a depth camera. In this example, the image sensor 134r is the detection area 139r. The image sensor 134 of the camera is located vertically on the optical axis 142 of the display optical system. In some examples, the camera may be located on frame 115 either above or below see-through lens 118 or embedded in the lens 118. In some embodiments, the illuminators 153 provide light for the camera, and in other embodiments the camera captures images with ambient lighting or light from its own light source. Image data captured may be used to determine alignment of the pupil with the optical axis. Gaze determination techniques based on image data, glint data or both may be used based on the geometry of the gaze detection elements.

In this example, the motor 203 in bridge 104 moves the display optical system 14r in a horizontal direction with respect to the user's eye as indicated by directional symbol 145. The flexible frame portions 215a and 215b slide within grooves 217a and 217b as the system 14 is moved. In this example, reflecting element 124a of an microdisplay assembly 173 embodiment is stationery. As the IPD is typically determined once and stored, any adjustment of the focal length between the microdisplay 120 and the reflecting element 124a that may be done may be accomplished by the microdisplay assembly, for example via adjustment of the microdisplay elements within the armature 137.

FIG. 9C is a top view of a third embodiment of a movable display optical system of a see-through, near-eye, mixed reality device including an arrangement of gaze detection elements. The display optical system 14 has a similar arrangement of gaze detection elements including IR illuminators 153 and photodetectors 152, and a light sensor 134r located on the frame 115 or lens 118 below or above optical axis 142. In this example, the display optical system 14 includes a light guide optical element 112 as the reflective element for directing the images into the user's eye and is situated between an additional see-through lens 116 and see-through lens 118. As reflecting element 124 is within the lightguide optical element 112 and moves with the element 112, an embodiment of a microdisplay assembly 173 is attached on the temple 102 in this example to a display adjustment mechanism 203 for the display optical system 14 embodied as a set of three axis motor 203 with shafts 205 include at least one for moving the microdisplay assembly. One or more motors 203 on the bridge 104 are representative of the other components of the display adjustment mechanism 203 which provides three axes of movement 145. In another embodiment, the motors may operate to only move the devices via their attached shafts 205 in the horizontal direction. The motor 203 for the microdisplay assembly 173 would also move it horizontally for maintaining alignment between the light coming out of the microdisplay 120 and the reflecting element 124. A processor 210 of the control circuitry (see FIG. 10A) coordinates their movement.

Lightguide optical element 112 transmits light from microdisplay 120 to the eye of the user wearing head mounted display device 2. Lightguide optical element 112 also allows light from in front of the head mounted display device 2 to be transmitted through lightguide optical element 112 to the user's eye thereby allowing the user to have an actual direct view of the space in front of head mounted display device 2 in addition to receiving a virtual image from microdisplay 120. Thus, the walls of lightguide optical element 112 are see-through. Lightguide optical element 112 includes a first reflecting surface 124 (e.g., a mirror or other surface). Light from microdisplay 120 passes through lens 122 and becomes incident on reflecting surface 124. The reflecting surface 124 reflects the incident light from the microdisplay 120 such that light is trapped inside a planar, substrate comprising lightguide optical element 112 by internal reflection.

After several reflections off the surfaces of the substrate, the trapped light waves reach an array of selectively reflecting surfaces 126. Note that only one of the five surfaces is labeled 126 to prevent over-crowding of the drawing. Reflecting surfaces 126 couple the light waves incident upon those reflecting surfaces out of the substrate into the eye of the user. More details of a lightguide optical element can be found in United States Patent Application Publication 2008/0285140, Ser. No. 12/214,366, published on Nov. 20, 2008, "Substrate-Guided Optical Devices" incorporated herein by reference in its entirety. In one embodiment, each eye will have its own lightguide optical element 112.

FIG. 9D is a top view of a fourth embodiment of a movable display optical system of a see-through, near-eye, mixed reality device including an arrangement of gaze detection elements. This embodiment is similar to FIG. 9C's embodiment including a light guide optical element 112. However, the only light detectors are the IR photodetectors 152, so this embodiment relies on glint detection only for gaze detection as discussed in the examples below.

In the embodiments of FIGS. 9A-9D, the positions of the gaze detection elements, e.g. the detection area 139 and the illuminators 153 and photodetectors 152 are fixed with respect to each other. In these examples, they are also fixed in relation to the optical axis of the display optical system 14.

In the embodiments above, the specific number of lenses shown are just examples. Other numbers and configurations of lenses operating on the same principles may be used. Additionally, in the examples above, only the right side of the see-through, near-eye display 2 are shown. A full near-eye, mixed reality display device would include as examples another set of lenses 116 and/or 118, another lightguide optical element 112 for the embodiments of FIGS. 9C and 9D, another micro display 120, another lens system 122, likely another environment facing camera 113, another eye tracking camera 134 for the embodiments of FIGS. 9A to 9C, earphones 130, and a temperature sensor 138.

Figure 10B:
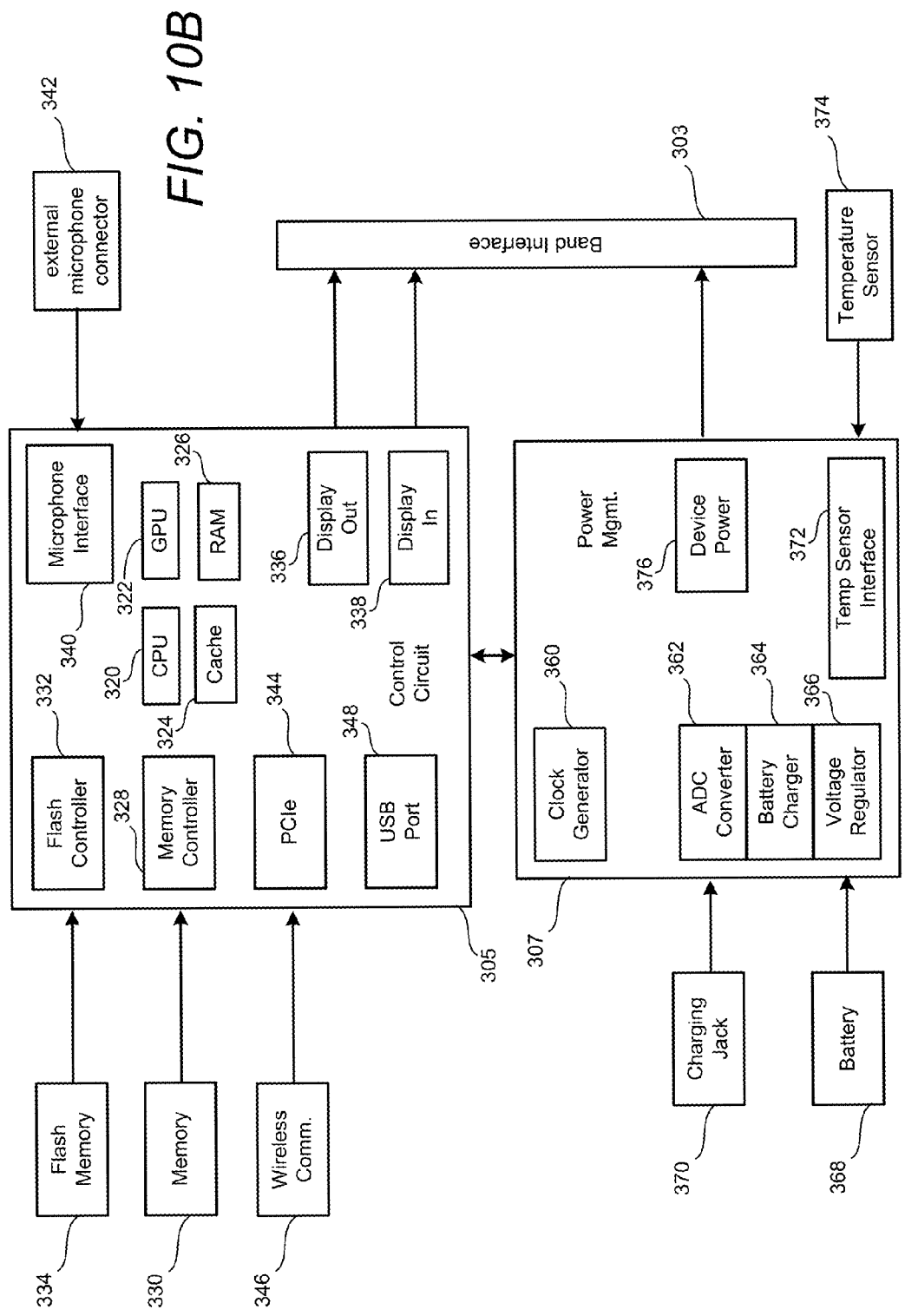
FIG. 10B is a block diagram of one embodiment of the hardware and software components of a processing unit associated with a see-through, near-eye, mixed reality display unit.

FIG. 10A is a block diagram of one embodiment of hardware and software components of a see-through, near-eye, mixed reality display unit 2 as may be used with one or more embodiments. FIG. 10B is a block diagram describing the various components of a processing unit 4, 5. In this embodiment, near-eye display device 2, receives instructions about a virtual image from processing unit 4, 5 and provides the sensor information back to processing unit 4, 5. Software and hardware components which may be embodied in a processing unit 4, 5 are depicted in FIG. 10B, will receive the sensory information from the display device 2 and may also receive sensory information from hub computing device 12 (See FIG. 1A). Based on that information, processing unit 4, 5 will determine where and when to provide a virtual image to the user and send instructions accordingly to the control circuitry 136 of the display device 2.

Note that some of the components of FIG. 10A (e.g., physical environment facing camera 113, eye camera 134, variable virtual focus adjuster 135, photodetector interface 139, micro display 120, illumination device 153 or illuminators, earphones 130, temperature sensor 138, display adjustment mechanism 203) are shown in shadow to indicate that there are at least two of each of those devices, at least one for the left side and at least one for the right side of head mounted display device 2. FIG. 10A shows the control circuit 200 in communication with the power management circuit 202. Control circuit 200 includes processor 210, memory controller 212 in communication with memory 214 (e.g., D-RAM), camera interface 216, camera buffer 218, display driver 220, display formatter 222, timing generator 226, display out interface 228, and display in interface 230. In one embodiment, all of components of control circuit 220 are in communication with each other via dedicated lines of one or more buses. In another embodiment, each of the components of control circuit 200 are in communication with processor 210.

Camera interface 216 provides an interface to the two physical environment facing cameras 113 and each eye camera 134 and stores respective images received from the cameras 113, 134 in camera buffer 218. Display driver 220 will drive microdisplay 120. Display formatter 222 may provide information, about the virtual image being displayed on microdisplay 120 to one or more processors of one or more computer systems, e.g. 4, 5, 12, 210 performing processing for the augmented reality system. Timing generator 226 is used to provide timing data for the system. Display out 228 is a buffer for providing images from physical environment facing cameras 113 and the eye cameras 134 to the processing unit 4, 5. Display in 230 is a buffer for receiving images such as a virtual image to be displayed on microdisplay 120. Display out 228 and display in 230 communicate with band interface 232 which is an interface to processing unit 4, 5.

Power management circuit 202 includes voltage regulator 234, eye tracking illumination driver 236, variable adjuster driver 237, photodetector interface 239, audio DAC and amplifier 238, microphone preamplifier and audio ADC 240, temperature sensor interface 242, display adjustment mechanism driver(s) 245 and clock generator 244. Voltage regulator 234 receives power from processing unit 4, 5 via band interface 232 and provides that power to the other components of head mounted display device 2. Illumination driver 236 controls, for example via a drive current or voltage, the illumination devices 153 to operate about a predetermined wavelength or within a wavelength range. Audio DAC and amplifier 238 receives the audio information from earphones 130. Microphone preamplifier and audio ADC 240 provides an interface for microphone 110. Temperature sensor interface 242 is an interface for temperature sensor 138. One or more display adjustment drivers 245 provide control signals to one or more motors or other devices making up each display adjustment mechanism 203 which represent adjustment amounts of movement in at least one of three directions. Power management unit 202 also provides power and receives data back from three axis magnetometer 132A, three axis gyro 132B and three axis accelerometer 132C. Power management unit 202 also provides power and receives data back from and sends data to GPS transceiver 144.

The variable adjuster driver 237 provides a control signal, for example a drive current or a drive voltage, to the adjuster 135 to move one or more elements of the microdisplay assembly 173 to achieve a displacement for a focal region calculated by software executing in a processor 210 of the control circuitry 13, or the processing unit 4,5 or the hub computer 12 or both. In embodiments of sweeping through a range of displacements and, hence, a range of focal regions, the variable adjuster driver 237 receives timing signals from the timing generator 226, or alternatively, the clock generator 244 to operate at a programmed rate or frequency.

The photodetector interface 239 performs any analog to digital conversion needed for voltage or current readings from each photodetector, stores the readings in a processor readable format in memory via the memory controller 212, and monitors the operation parameters of the photodetectors 152 such as temperature and wavelength accuracy.

FIG. 10B is a block diagram of one embodiment of the hardware and software components of a processing unit 4 associated with a see-through, near-eye, mixed reality display unit. The mobile device 5 may include this embodiment of hardware and software components as well as similar components which perform similar functions. FIG. 10B shows controls circuit 305 in communication with power management circuit 307. Control circuit 305 includes a central processing unit (CPU) 320, graphics processing unit (GPU) 322, cache 324, RAM 326, memory control 328 in communication with memory 330 (e.g., D-RAM), flash memory controller 332 in communication with flash memory 334 (or other type of non-volatile storage), display out buffer 336 in communication with see-through, near-eye display device 2 via band interface 303 and band interface 232, display in buffer 338 in communication with near-eye display device 2 via band interface 303 and band interface 232, microphone interface 340 in communication with an external microphone connector 342 for connecting to a microphone, PCI express interface for connecting to a wireless communication device 346, and USB port(s) 348.

In one embodiment, wireless communication component 346 can include a Wi-Fi enabled communication device, Bluetooth communication device, infrared communication device, etc. The USB port can be used to dock the processing unit 4, 5 to hub computing device 12 in order to load data or software onto processing unit 4, 5, as well as charge processing unit 4, 5. In one embodiment, CPU 320 and GPU 322 are the main workhorses for determining where, when and how to insert images into the view of the user.

Power management circuit 307 includes clock generator 360, analog to digital converter 362, battery charger 364, voltage regulator 366, see-through, near-eye display power source 376, and temperature sensor interface 372 in communication with temperature sensor 374 (located on the wrist band of processing unit 4). An alternating current to direct current converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. Device power interface 376 provides power to the display device 2.

Figure 11A:
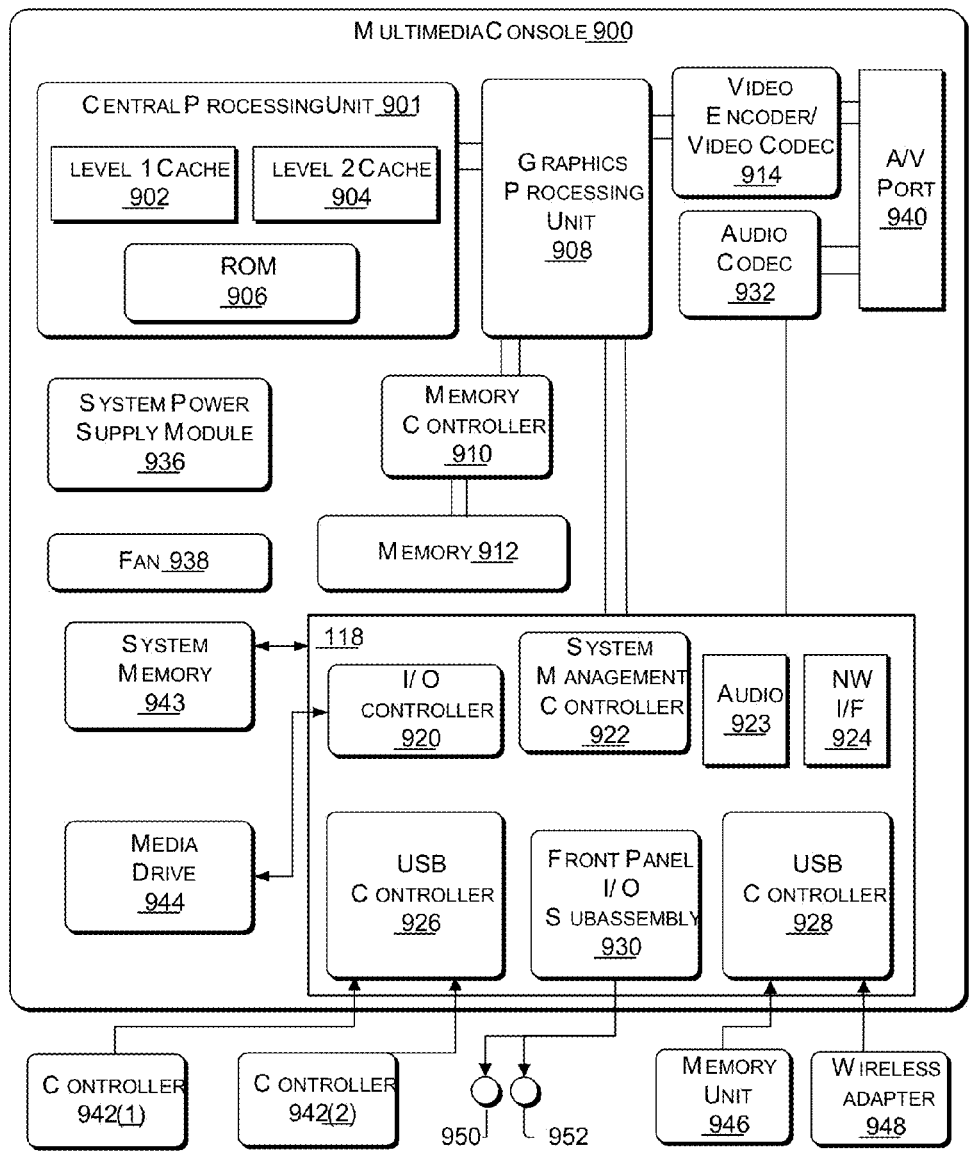
FIG. 11A illustrates an example of a computing environment including a multimedia console (or gaming console) that may be used to implement the computing system.

FIG. 11A illustrates an example of a computing environment including a multimedia console (or gaming console)

900 that may be used to implement the computing system 12. The capture device 20 may be coupled to the computing system 12. As shown in FIG. 11A, the multimedia console 900 has a central processing unit (CPU) 901 having a level 1 cache 902, a level 2 cache 904, and a flash ROM (Read Only Memory) 906. The level 1 cache 902 and a level 2 cache 904 temporarily store data and hence reduce the number of memory access cycles, thereby improving processing speed and throughput. The CPU 901 may be provided having more than one core, and thus, additional level 1 and level 2 caches 902 and 904. The flash ROM 906 may store executable code that is loaded during an initial phase of a boot process when the multimedia console 900 is powered ON.

A graphics processing unit (GPU) 908 and a video encoder/video codec (coder/decoder) 914 form a video processing pipeline for high speed and high resolution graphics processing. Data is carried from the graphics processing unit 908 to the video encoder/video codec 914 via a bus. The video processing pipeline outputs data to an A/V (audio/video) port 940 for transmission to a television or other display. A memory controller 910 is connected to the GPU 908 to facilitate processor access to various types of memory 912, such as, but not limited to, a RAM (Random Access Memory).

The multimedia console 900 includes an I/O controller 920, a system management controller 922, an audio processing unit 923, a network interface controller 924, a first USB host controller 926, a second USB controller 928 and a front panel I/O subassembly 930 that are preferably implemented on a module 918. The USB controllers 926 and 928 serve as hosts for peripheral controllers 942(1)-142(2), a wireless adapter 948, and an external memory device 946 (e.g., flash memory, external CD/DVD ROM drive, removable media, etc.). The network interface 924 and/or wireless adapter 948 provide access to a network (e.g., the Internet, home network, etc.) and may be any of a wide variety of various wired or wireless adapter components including an Ethernet card, a modem, a Bluetooth module, a cable modem, and the like.

System memory 943 is provided to store application data that is loaded during the boot process. A media drive 944 is provided and may comprise a DVD/CD drive, hard drive, or other removable media drive, etc. The media drive 944 may be internal or external to the multimedia console 900. Application data may be accessed via the media drive 944 for execution, playback, etc. by the multimedia console 900. The media drive 944 is connected to the I/O controller 920 via a bus, such as a Serial ATA bus or other high speed connection (e.g., IEEE 1394).

The system management controller 922 provides a variety of service functions related to assuring availability of the multimedia console 900. The audio processing unit 923 and an audio codec 932 form a corresponding audio processing pipeline with high fidelity and stereo processing. Audio data is carried between the audio processing unit 923 and the audio codec 932 via a communication link. The audio processing pipeline outputs data to the A/V port 940 for reproduction by an external audio player or device having audio capabilities.

The front panel I/O subassembly 930 supports the functionality of the power button 950 and the eject button 952, as well as any LEDs (light emitting diodes) or other indicators exposed on the outer surface of the multimedia console 900. A system power supply module 936 provides power to the components of the multimedia console 900. A fan 938 cools the circuitry within the multimedia console 900.

The CPU 901, GPU 908, memory controller 910, and various other components within the multimedia console 900 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 900 is powered ON, application data may be loaded from the system memory 943 into memory 912 and/or caches 902, 904 and executed on the CPU 901. The application may present a graphical user interface that provides a consistent user experience when navigating to different media types available on the multimedia console 900. In operation, applications and/or other media contained within the media drive 944 may be launched or played from the media drive 944 to provide additional functionalities to the multimedia console 900.

The multimedia console 900 may be operated as a standalone system by simply connecting the system to a television or other display. In this standalone mode, the multimedia console 900 allows one or more users to interact with the system, watch movies, or listen to music. However, with the integration of broadband connectivity made available through the network interface 924 or the wireless adapter 948, the multimedia console 900 may further be operated as a participant in a larger network community.

When the multimedia console 900 is powered ON, a set amount of hardware resources are reserved for system use by the multimedia console operating system. These resources may include a reservation of memory (e.g., 96 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 900 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 901 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager controls the gaming application audio level (e.g., mute, attenuate) when system applications are active.

Input devices (e.g., controllers 942(1) and 942(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. In some embodiments, the capture device 20 of FIG. 2 may be an additional input device to multimedia console 900.

Figure 11B:
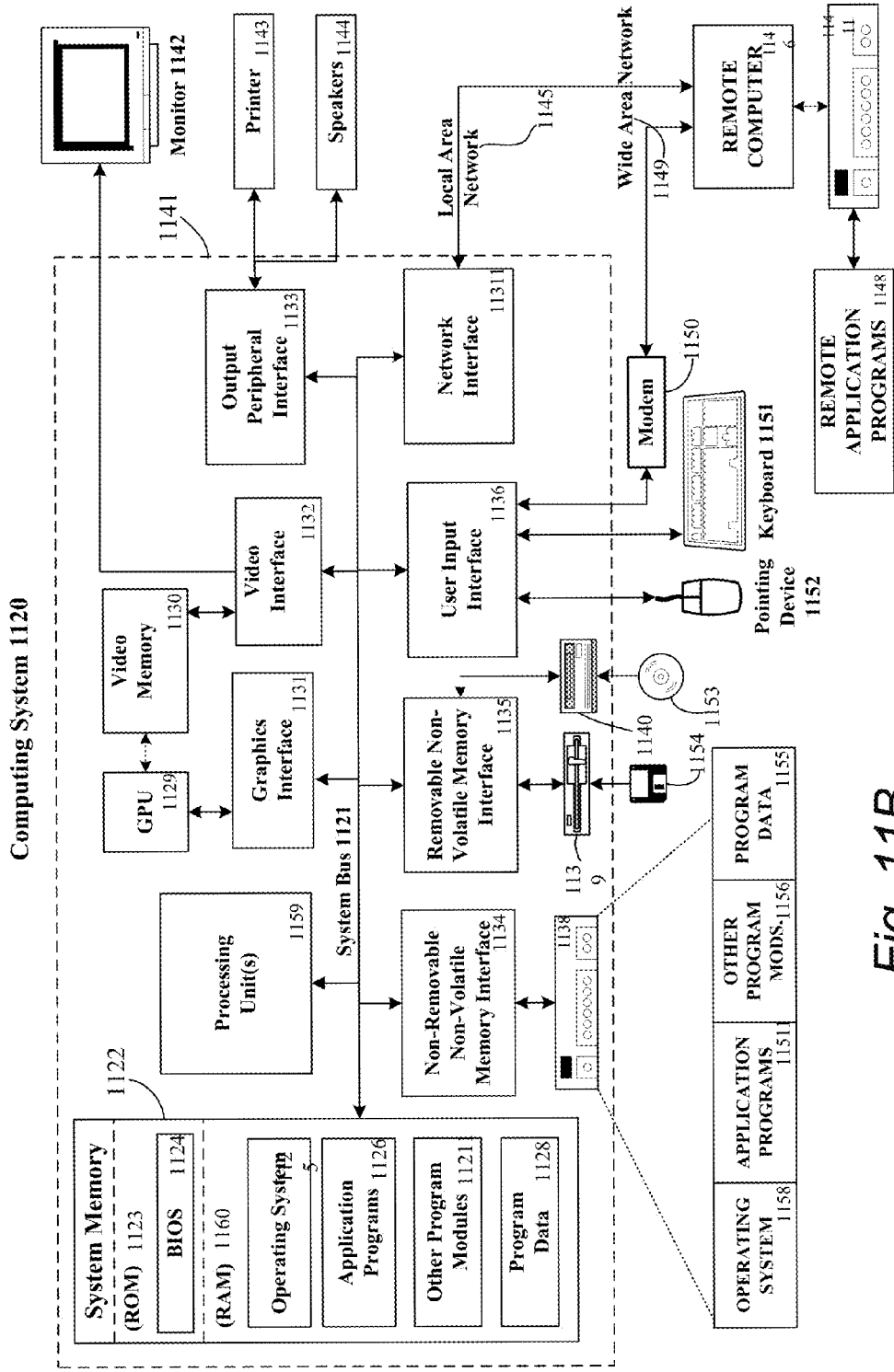
FIG. 11B illustrates another example of a computing environment that may be used to implement a computing system.

FIG. 11B illustrates another example of a computing environment that may be used to implement the computing system 12. The capture device 20 may be coupled to the computing environment. The computing environment of FIG. 11B is only one example of a suitable computing environment and is not intended to suggest any limitation as to the scope of use or functionality of the presently disclosed subject matter. Neither should the computing system 12 of FIG. 2 be interpreted as having any dependency or requirement relating to any one or combination of components illustrated in the exemplary operating environment of FIG. 11B. In some embodiments, the various depicted computing elements may include circuitry configured to instantiate specific aspects of the present disclosure. For example, the term circuitry used in the disclosure can include specialized hardware components configured to perform function(s) by firmware or switches. In other examples, the term circuitry can include a general-purpose processing unit, memory, etc., configured by software instructions that embody logic operable to perform function(s). In embodiments where circuitry includes a combination of hardware and software, an implementer may write source code embodying logic and the source code can be compiled into machine readable code that can be processed by the general purpose processing unit.

In FIG. 11B, the computing system 1120 comprises a computer 1141, which typically includes a variety of computer readable media. Computer readable media (or processor readable storage device) can be any available media that can be accessed by computer 1141 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other storage medium which can be used to store the desired information and which can be accessed by computer.

The computer 1141 may also include other removable/non-removable, volatile/nonvolatile computer storage media. By way of example, FIG. 11B illustrates a hard disk drive 1138 that reads from or writes to non-removable, nonvolatile magnetic media, a magnetic disk drive 1139 that reads from or writes to a removable, nonvolatile magnetic disk 1154, and an optical disk drive 1140 that reads from or writes to a removable, nonvolatile optical disk 1153 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1138 is typically connected to the system bus 1121 through a non-removable memory interface such as interface 1134, and magnetic disk drive 1139 and optical disk drive 1140 are typically connected to the system bus 1121 by a removable memory interface, such as interface 1135.

A basic input/output system 1124 (BIOS), containing the basic routines that help to transfer information between elements within computer 1141, such as during start-up, is typically stored in ROM 1123. RAM 1160 typically contains data and/or program modules that are immediately accessible to and/or presently being operated on by processing unit 1159. By way of example, and not limitation, FIG. 11B illustrates operating system 1125, application programs 1126, other program modules 1127, and program data 1128.

The drives and their associated computer storage media discussed above and illustrated in FIG. 10, provide storage of computer readable instructions, data structures, program modules and other data for the computer 1141. In FIG. 11B, for example, hard disk drive 1138 is illustrated as storing operating system 1158, application programs 1157, other program modules 1156, and program data 1155. Note that these components can either be the same as or different from operating system 1125, application programs 1126, other program modules 1127, and program data 1128. Operating system 1158, application programs 1157, other program modules 1156, and program data 1155 are given different numbers here to illustrate that, at a minimum, they are different copies. A user may enter commands and information into the computer 1141 through input devices such as a keyboard 1151 and pointing device 1152, commonly referred to as a mouse, trackball or touch pad. Other input devices (not shown) may include a microphone, joystick, game pad, satellite dish, scanner, or the like. These and other input devices are often connected to the processing unit 1159 through a user input interface 1136 that is coupled to the system bus, but may be connected by other interface and bus structures, such as a parallel port, game port or a universal serial bus (USB). The cameras 34, 36 and capture device 20 may define additional input devices for the computer 1141. A monitor 1142 or other type of display device is also connected to the system bus 1121 via an interface, such as a video interface 1132. In addition to the monitor, computers may also include other peripheral output devices such as speakers 1144 and printer 1143, which may be connected through a output peripheral interface 1133.

The computer 1141 may operate in a networked environment using logical connections to one or more remote computers, such as a remote computer 1146. The remote computer 1146 may be a personal computer, a server, a router, a network PC, a peer device or other common network node, and typically includes many or all of the elements described above relative to the computer 1141, although only a memory storage device 1147 has been illustrated in FIG. 11B. The logical connections include a local area network (LAN) 1145 and a wide area network (WAN) 1149, but may also include other networks. Such networking environments are commonplace in offices, enterprise-wide computer networks, intranets and the Internet.

When used in a LAN networking environment, the computer 1141 is connected to the LAN 1145 through a network interface or adapter 1137. When used in a WAN networking environment, the computer 1141 typically includes a modem 1150 or other means for establishing communications over the WAN 1149, such as the Internet. The modem 1150, which may be internal or external, may be connected to the system bus 1121 via the user input interface 1136, or other appropriate mechanism. In a networked environment, program modules depicted relative to the computer 1141, or portions thereof, may be stored in the remote memory storage device. By way of example, and not limitation, FIG. 11B illustrates remote application programs 1148 as residing on memory device 1147. It will be appreciated that the network connections shown are exemplary and other means of establishing a communications link between the computers may be used.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed is:

1. A method comprising:
   determining a three-dimensional (3D) position of an input object relative to a surface based on 3D image data comprising pixels each having a location and depth value, the determining including:
   placing pixels in the 3D image data into a first group for background pixels, a second group for pixels in a contact zone relative to the surface, and a third group for pixels in a hover zone relative to the surface;
   detecting candidate groups of pixels in the 3D image that seem to be part of the same object based on their respective location and depth value;
   selecting a first of the candidate groups as being the input object;
   determining whether pixels in the selected group are in the contact zone; and
   determining whether pixels in the selected group are in the hover zone;
   rendering a user input element on a display associated with an electronic device based on the 3D position of the object relative to the surface; and
   receiving user input for the electronic device based on the 3D position of the object relative to the surface, including generating a touch event when pixels of the selected group are in the contact zone and generating a hover event when pixels of the selected group are in the hover zone.

2. The method of claim 1, wherein the second group for the contact zone comprises a zone that is within a first pre-determined distance from the surface but is not on the surface, wherein the third group for the hover zone comprises a zone that is from the first pre-determined distance to a second pre-determined distance from the surface that is farther away from the surface.

3. The method of claim 1, wherein placing pixels in the 3D image data into the first group for background pixels, the second group for pixels in the contact zone, and the third group for pixels in the hover zone comprises determining a distance from the surface for pixels in the 3D image data.

4. The method of claim 1, wherein the input object is a user's hand, further comprising:
   defining a group of pixels in the 3D image that are associated with the user's hand and that are in the contact zone as a touch blob; and
   tracking the touch blob over time.

5. The method of claim 4, further comprising:
   identifying the touch blob as a specific finger of either the right or left hand of the user.

6. The method of claim 1, wherein the determining a 3D position of an object relative to a surface based on 3D image data includes:
   determining whether the object is touching or nearly touching the surface based on the whether pixels in the selected group are in the contact zone.

7. The method of claim 6, wherein the user input is a selection associated with an element presented on the display.

8. The method of claim 7, wherein the rendering the user input element includes:
   highlighting a portion of the user input element to represent the portion of a user's hand that is touching or nearly touching the surface, the user's hand being the object.

9. The method of claim 1, wherein the determining a 3D position of an object relative to a surface based on 3D image data includes:
   determining whether the object is hovering within a hover zone over the surface based on whether pixels in the selected group are in the hover zone.

10. The method of claim 9, wherein the user input is a hover event associated with an element over which the user input element is hovering on the display.

11. The method of claim 10, wherein the rendering the user input element includes:
    highlighting the user input element on the display to represent that a user's hand is in the hover zone over the surface.

12. An apparatus comprising:
    a 3D camera;
    a display;
    processing logic coupled to the 3D camera and to the display, the processing logic is configured to:
    determine a location of a surface based on image data from the 3D camera;
    determine a 3D position of a user's hand relative to the surface based on 3D image data from the 3D camera, the 3D image data comprising pixels each having a location and depth value, the processing logic being configured to determine the 3D position includes the processing logic being configured to:

place pixels in the 3D image data into a first group for background pixels, a second group for pixels in a contact zone relative to the surface, and a third group for pixels in a hover zone relative to the surface;

detect candidate groups of pixels in the 3D image that seem to be part of the same object based on their respective location and depth value;

select a first of the candidate groups as being the user's hand;

determine whether pixels in the selected group are in the contact zone; and determine whether pixels in the selected group are in the hover zone;

render a transparent representation of the user's hand over an image on the display based on the 3D position of the user's hand relative to the surface; and receive user input based on the 3D position of the user's hand relative to the surface including the processing logic being configured to generate a touch event when pixels of the selected group are in the contact zone and to generate a hover event when pixels of the selected group are in the hover zone.

13. The apparatus of claim 12, wherein the processing logic is configured to:
   determine a touch region on the surface; and
   correlate portions within the touch region to positions on the display.

14. The apparatus of claim 13, wherein the processing logic is configured to:
   determine whether the user's hand is within a contact zone touching or nearly touching the surface based on whether pixels in the selected group are in the contact zone; and
   determine whether the user's hand is hovering within a hover zone over the surface.

15. The apparatus of claim 14, wherein the processing logic is configured to:
   highlight a portion of the representation of the user's hand on the display to represent a portion of the user's hand that is touching or nearly touching the surface; and
   highlight at least a portion of the representation of the user's hand on the display to represent that the user's hand is hovering within the hover zone over the surface.

16. The apparatus of claim 14, wherein the processing logic is configured to render shadows of the representation of the user's hand on the display based on virtual light sources to represent how far the user's hand is from the surface.

17. A method of allowing input to an electronic device associated with a display, the method comprising:
   determining a location of a surface based on 3D image data, the surface not being a surface of the display or of the electronic device;
   determining a touch region on the surface;
   determining a 3D position of a user's hand relative to the touch region on the surface based on 3D image data comprising pixels each having a location and depth value, including:
   placing pixels in the 3D image data into a first group for background pixels, a second group for pixels in a contact zone above the surface, and a third group for pixels in a hover zone above the surface;
   detecting candidate groups of pixels that seem to be part of the same object based on their respective location and depth value;
   selecting a first of candidate groups as being the user's hand;
   determining whether pixels in the selected group are in the contact zone; and
   determining whether pixels in the selected group are in the hover zone;
   correlating positions within the touch region to positions on the display associated with the electronic device;
   rendering a transparent representation of the user's hand over an element on the display based on the 3D position of the user's hand relative to the touch region such that the element may be seen through the transparent representation of the user's hand; and
   receiving user input for the electronic device based on the 3D position of the user's hand relative to the touch region, including generating a touch event when pixels of the selected group are in the contact zone and generating a hover event when pixels of the selected group are in the hover zone.

18. The method of claim 17, wherein the determining a 3D position of a user's hand relative to the touch region includes:
   determining whether the user's hand is within a first pre-determined range of distances from a plane defined by the surface based on whether pixels in the selected group are in the contact zone, the first pre-determined range of distances defining a contact zone;
   determining whether the user's hand is within a second pre-determined range of distances from the plane based on whether pixels in the selected group are in the hover zone, the second pre-determined range of distances defining a hover zone; and
   determining a projection of the user's hand onto the plane of the touch region.

19. The method of claim 18, wherein the receiving user input includes:
   tracking movement of the user's hand across the touch region when the user's hand is within the contact zone.

20. The method of claim 18, wherein the generating a hover event includes:
   determining that the representation of the user's hand on the display hovers over an element presented on the display for a pre-determined period of time.

* * * * *